United States Patent
Ahn et al.

(10) Patent No.: US 11,124,196 B2
(45) Date of Patent: Sep. 21, 2021

(54) RECEDING HORIZON STATE ESTIMATOR

(71) Applicant: Mitsubishi Electric Research Laboratories, Inc., Cambridge, MA (US)

(72) Inventors: Heejin Ahn, Cambridge, MA (US); Claus Danielson, Somerville, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 224 days.

(21) Appl. No.: 16/460,824

(22) Filed: Jul. 2, 2019

(65) Prior Publication Data

US 2021/0001868 A1    Jan. 7, 2021

(51) Int. Cl.
| | |
|---|---|
| *B60W 50/00* | (2006.01) |
| *B60W 40/00* | (2006.01) |
| *G06F 17/11* | (2006.01) |
| *G06F 17/17* | (2006.01) |
| *G07C 5/08* | (2006.01) |
| *G05D 1/00* | (2006.01) |

(52) U.S. Cl.
CPC ........ *B60W 50/0097* (2013.01); *B60W 40/00* (2013.01); *G06F 17/11* (2013.01); *G06F 17/17* (2013.01); *G07C 5/0808* (2013.01); *B60W 2554/801* (2020.02); *G05D 1/0088* (2013.01)

(58) Field of Classification Search
CPC combination set(s) only.
See application file for complete search history.

(56) References Cited

U.S. PATENT DOCUMENTS

| | | | |
|---|---|---|---|
| 10,860,002 B2* | 12/2020 | Goldsmith | G05B 19/41 |
| 2018/0059670 A1* | 3/2018 | Nilsson | G05D 1/0214 |
| 2020/0097010 A1* | 3/2020 | Maila | G05D 1/0214 |
| 2020/0218272 A1* | 7/2020 | Ellis | G05D 1/0221 |

OTHER PUBLICATIONS

Marina Murillo et al., "A Receding Horizon Framework for Autonomy in Unmanned Vehicles", Cornell University Library, Jun. 25, 2019, pp. 1-19, XP081379535.

(Continued)

*Primary Examiner* — Thomas G Black
*Assistant Examiner* — Anthony M Gartrelle
(74) *Attorney, Agent, or Firm* — Gene Vinokur; Hironori Tsukamoto

(57) ABSTRACT

A receding horizon state estimator estimates state of a vehicle such as to reduce total communication cost of acquiring external measurements over a prediction horizon, in which state estimation accuracy for a time step is a function of state estimation accuracy for a previous time step. For each time step of the prediction horizon, estimator selects a subset of external sensors with external measurements sufficient to estimate the state with accuracy satisfying the constraint on state estimation accuracy for the corresponding time step while reducing a total communication cost of acquiring the external measurements over the prediction horizon. The estimator requests the external measurements from the subset of external sensors determined for a current time step and estimates the state of the vehicle using the internal and the requested external measurements.

20 Claims, 25 Drawing Sheets

(56) References Cited

OTHER PUBLICATIONS

Yilin Mo et al., "Network Lifetime Maximization via Sensor Selection", Asian Control Conference 2009, Aug. 27, 2009, pp. 441-446, XP031539125.
Ahn Heejin et al., "Moving Horizon Sensor Selection for Reducing Communication Costs with Applications to Internet of Vehicles", 2019 American Control Conference, Jul. 10, 2019, pp. 1464-1469, XP033604796.

* cited by examiner

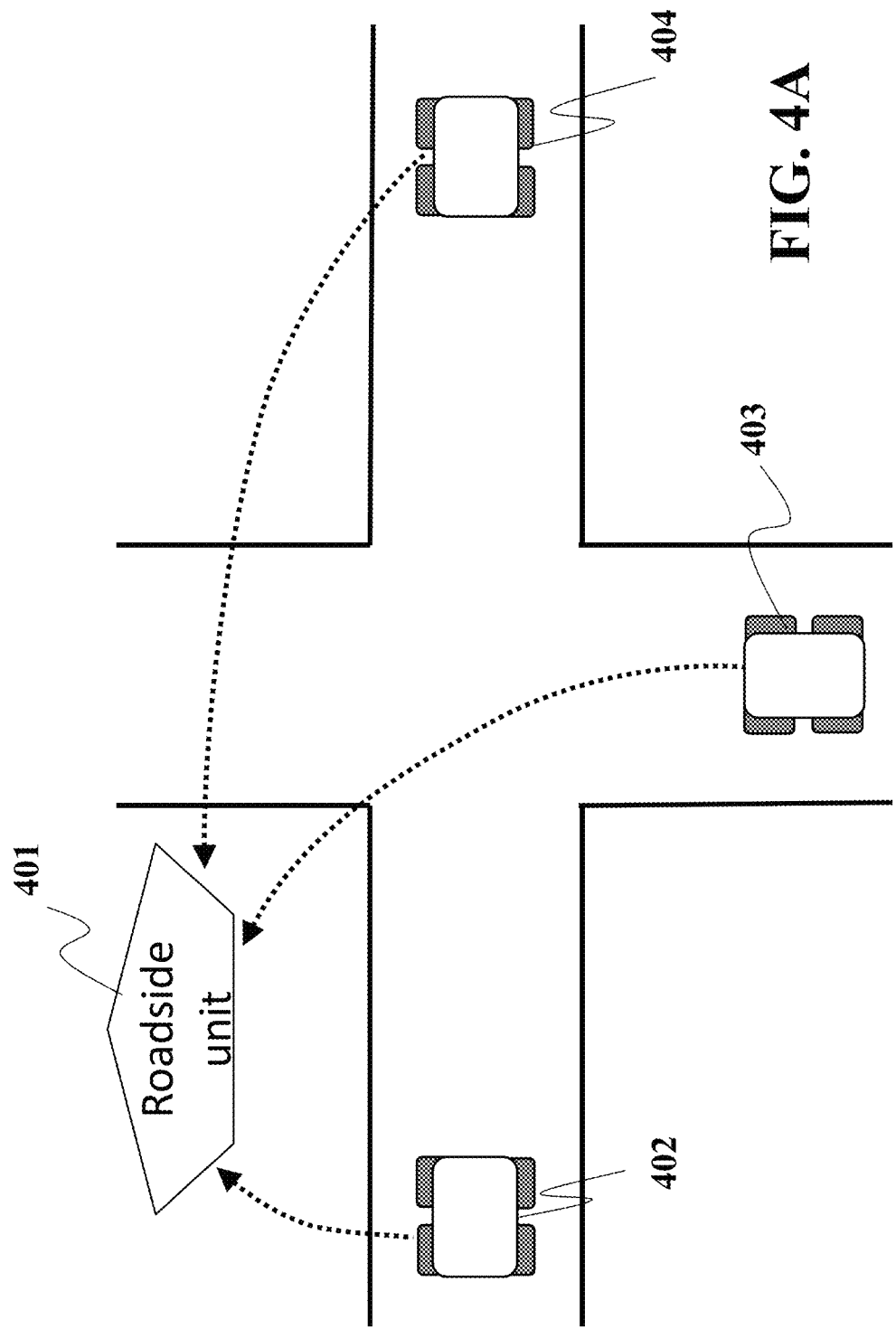

At time t0

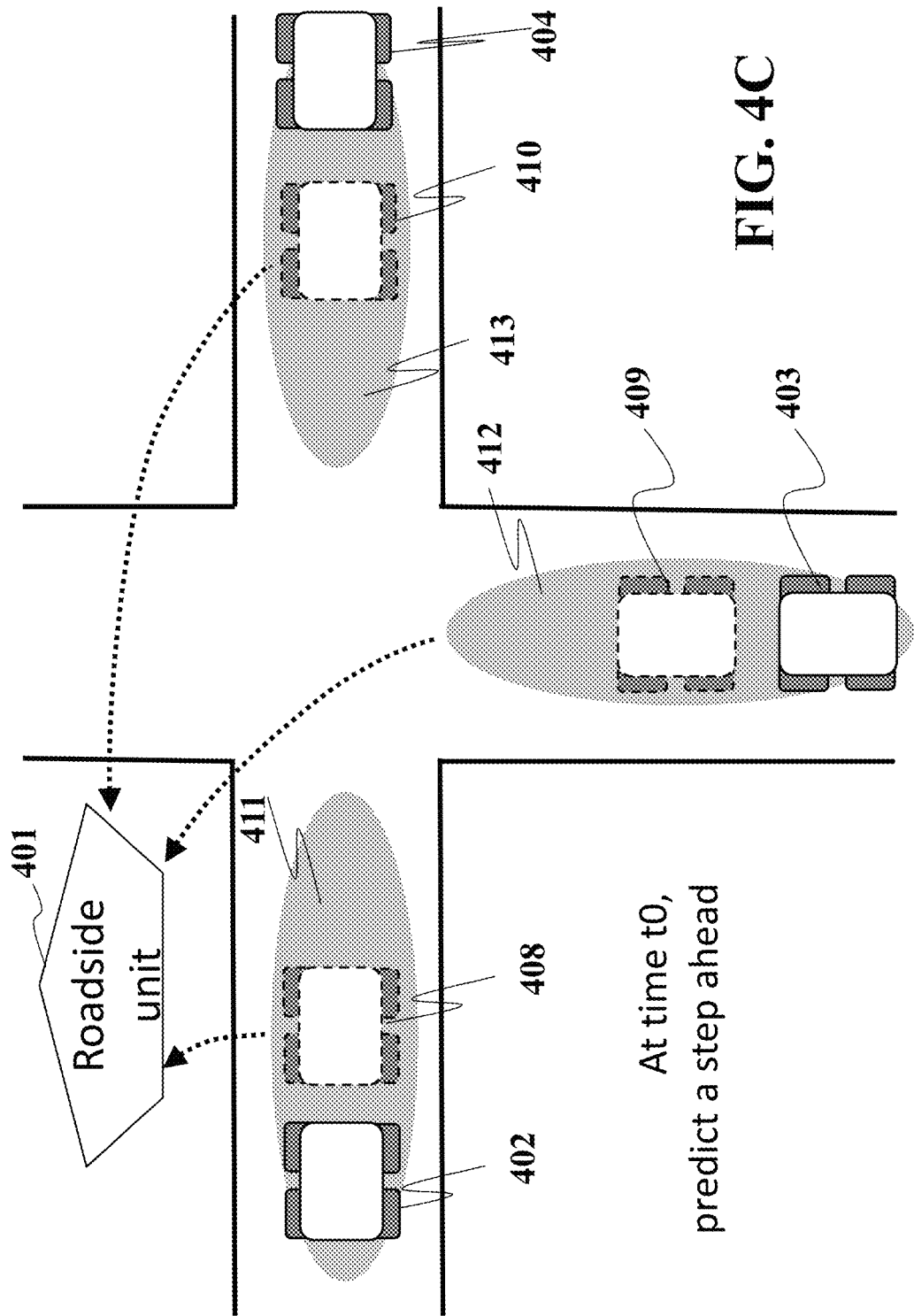

RECEDING HORIZON STATE ESTIMATOR

TECHNICAL FIELD

The invention relates generally to autonomous driving and advanced driver-assistance systems, and, more particularly, to constrained estimation of a state of a vehicle subject to communication cost of acquiring the measurements.

BACKGROUND

Reliable state estimation of a vehicle is a key component for autonomous driving and advanced driver-assistance systems (ADAS). For example, one component in an autonomous vehicle and ADAS is the motion planner, which takes information about the surroundings and computes a trajectory profile to navigate from a current location towards a goal location, often in presence of moving obstacles. As another example, ADAS, such as lane-change systems, need accurate information about where the vehicle is located with respect to other vehicles, both at the current time, but also for some future time.

To that end, modern vehicles sometimes employ various sensors that are used to estimate or measure motion of a vehicle, enabling collision warning or avoidance and other active safety applications. As used herein, a sensor is a device, module, or subsystem whose purpose is to detect events or changes in its environment and send the information to other electronics, frequently a computer processor. A sensor can be used with other electronics, whether as simple as a light or as complex as a computer.

For example, a state observer of a vehicle configured to estimate a state of the vehicle may employ a number of different sensor and/or sensing technologies, such as short range radar, long range radar, cameras with image processing, laser or LiDAR, ultrasound for estimating a state of the vehicle. The sensors detect vehicles and other objects in the path of a host vehicle, and a control system uses sensed information to take actions as appropriate.

In many vehicles, the sensors are internal to a vehicle, e.g., a speedometer for measuring speed, or a camera integrated directly into the front bumper or other fascia of the vehicle. Typically, these internal sensors provide their measurements to a state observer system of the vehicle through wired communication links, e.g., through buses. However, in some situations, the measurements of the internal sensors may be insufficient to estimate the state of the vehicle and other objects surrounding the vehicle with sufficient accuracy. To that end, in some situations, a state observer of a vehicle can use sensors external to the vehicle.

Specifically, in the Internet of Vehicles (IoV), a large number of measurements of external sensors are available to a vehicle through communication over wireless links. Examples of sensors external to a vehicle include internal sensors of other vehicles and other sensors of road infrastructures e.g. a traffic camera. Some state-of-the-art state estimators use available measurements of both the internal and external sensors for estimating the states of the vehicle, see, e.g., U.S. Pat. No. 10,048,686. For example, a Kalman filter can be used for state estimation using all available measurements. However, this method requires high costs of transmitting and processing all the data, and constraints on communication bandwidth and computation power can limit the amount of data.

Accordingly, there is a need to reduce communication cost of transmitting measurements of external sensors while maintaining sufficient accuracy of state estimation of a vehicle.

SUMMARY

It is an object of some embodiments to provide a system and a method for estimating a state of a vehicle and/or other surrounding objects with a desired accuracy using at least some measurements from internal and external sensors. Additionally, or alternatively, it is another object of some embodiments to provide such a state estimation that can reduce a cost of communicating measurements of external sensor over wireless communication links for a current time step while maintaining a desired accuracy of state estimation for future time steps.

The internal sensors provide measurements, referred herein as internal measurements, to a state estimator over an internal communication channel, such as wired communication over wires and short-range wireless communication over private wireless protocols such as Bluetooth. The communication cost of transmitting internal measurements over the internal communication channel is insignificant. In contrast, the external sensor provides measurements, referred herein as external measurements, to a state estimator over a shared communication channel, such as radio wireless channels via various vehicle communication standards, such as vehicle-to-everything (V2X) standard of communication for passing of information from a vehicle to any entity that may affect the vehicle, and vice versa. Other types of vehicle communication standards include V2I (vehicle-to-infrastructure), V2N (vehicle-to-network), V2V (vehicle-to-vehicle), V2P (vehicle-to-pedestrian), V2D (vehicle-to-device) and V2G (vehicle-to-grid). The communication cost of transmitting the external measurements over the shared communication channel can be significant in terms of packets delaying and dropping rates.

In this disclosure, the notation of the external and/or internal sensor depends on the location of the state estimator and can vary for different applications. For example, when the state estimator is executed by a processor of a vehicle, the sensors of the vehicle are internal sensors, while sensors of other vehicles or roadside assisting units are external sensors. In contrast, when the state estimator is implemented by an edge computing device of a roadside assisting unit, the sensors of the roadside unit are internal sensors, while the sensors of vehicles including sensors of the vehicle for which the state is estimated are external sensors.

Some embodiments are based on recognition that a maximum possible accuracy of a vehicle is an accuracy of a state estimated with measurements of all internal and external sensors available to a state estimator at a current time step. However, the state of the vehicle can be determined not with the maximum possible accuracy, but with an accuracy sufficient for a vehicle in a specific situation. For example, the accuracy may depend on the target accuracy of control of the vehicle. Moreover, some embodiments are based on recognition that different time varying situations can call for different accuracy. In other words, the desired accuracy of state estimation can vary for different time steps.

In some embodiments, the required accuracy of estimation of the state of the vehicle and other objects depends on the required accuracy of control of the vehicle and is determined with respect to how far the vehicle is from other objects/obstacles. For example, if the vehicle is close to the objects, higher accuracy in the estimation is required to prevent imminent collisions with the objects. For example, if a vehicle is far away from other vehicles, a controller of the vehicle can tolerate large estimation errors without causing any collision. However, when another vehicle approaches or when the vehicle performs a maneuver like a lane change or a turn, the controller needs to use more accurate state estimation. Hence, the required accuracy varies over time according to the changing environment.

Additionally, or alternatively, some embodiments are based on recognition that different combinations of external sensors can be available for a state estimator at different time steps. For example, a vehicle may be passing along different roadside assistance units having different sensor configuration. In another example, a vehicle may be in a neighborhood of a different kinds of vehicles that in addition to roadside assisting unit may provide external measurements. In these examples, the desired state accuracy may remain constant, while the number of different external sensors varies over time. For example, the desired accuracy of state estimation can be a predetermined parameter. Additionally, or alternatively, different time varying situations can call for both different accuracy and usage of different combination of external sensors.

Armed with this understanding, some embodiments are based on realization that this flexibility of combination of external sensors can be used to reduce communication cost of transmitting the external measurements of the external sensors. For example, the state of the vehicle and other objects surrounding the vehicle can be determined with internal measurements of internal sensors, while the measurements of external sensors can be requested only when needed to further improve the accuracy of the state. Moreover, in some situations, there is no need to request measurements from all available external sensors, but only from a subset of external sensors needed to achieve the desired accuracy.

In such a manner, at different time steps, different subsets of external sensors can be used to minimize communication cost while ensuring satisfaction of constraints on state estimation accuracy. However, some embodiments are based on realization that if the communication cost minimization is performed for each time step individually, i.e., independently from at least some other time steps, such a minimization can lead to violation of constraints on state estimation accuracy and/or suboptimal total communication cost over a time period.

Specifically, some embodiments are based on understanding that there is a relationship between the accuracy of the state estimated at a current time step and maximum possible accuracy of state estimation for a subsequent time step. This is because the increase of the accuracy is bounded from one-time step into another. Hence, if the accuracy of the state at the current time step is reduced without consideration of the accuracy required in the future, when there is a sudden increase in the desired accuracy for a subsequent time step, such a desired accuracy may not be achieved even with the entire set of external measurements. Similar problem may exist when there is a sudden decrease in availability of external measurements. In addition, joint variance in the required accuracy and availability of the external measurements may make this problem even more severe.

To that end, some embodiments disclose a receding horizon state estimator for estimating a state of a vehicle and surrounding vehicles based on a prediction horizon. The receding horizon state estimator borrows some principles of model predictive controller (MPC) to select a subset of external sensors for each time step based on an iterative, finite prediction horizon optimization of a cost function that describes a total communication cost of acquiring the external measurements over the prediction horizon while satisfying constraint on state estimation accuracy for each of time step of prediction horizon. In such a manner, the receding horizon state estimator has the ability to anticipate future events in selecting the subset of external sensors for each time step to ensure consistent constraints satisfaction while reducing the communication cost of external measurement.

In addition, and also in accordance to some MPC principles, after selecting a subset of external sensors for each time step, the external measurements from the subset of external sensors selected for a current time step are requested and the state of vehicles is estimated using the internal measurements of the internal sensors and the requested external measurements of the subset of external sensors determined for the current time step. After the state for the current time step is determined, the prediction horizon is shifted in time and the receding horizon state estimation is repeated until necessary. As used herein, a current time step is a step for whish the knowledge of the state is desired. Typically, the current time step is the first time step in the prediction horizon.

In some applications, the receding horizon state estimator is operatively connected to a controller for controlling the vehicle. In these applications, each time step can coincide with or correspond to a control step of a controller, such that the current time step determines state of the vehicle for the next control step. For example, the receding horizon state estimator can receive the constraint on state estimation accuracy for each time step of the prediction horizon from a controller controlling a movement of the vehicle, and can submit the state of the vehicle for the current time step to the controller.

In some embodiments, a communication cost of an external measurement is the cost of transferring the measurement from the external sensor. Examples of the communication cost include a size of a packet for transmitting the measurements and the delay in transmitting the measurements. For example, a communication cost of LiDAR sensor is greater than a communication cost of a proximity sensor but smaller than a communication cost of a video camera. Hence, some embodiments select a subset of external sensors to satisfy the constraint on accuracy requirement but to reduce a total communication cost. As used herein, a communication cost for a time step is a sum of communication costs of external sensors selected in the subset for the time step. Similarly, the total communication cost over a prediction horizon including a sequence of time steps is a sum of communication costs for all of these time steps.

For example, in one embodiment, each external sensor is associated with a communication cost, and the receding horizon state estimator solves an optimization problem that selects the subset of external measurements reducing a total communication cost subject to the constraint on state accuracy. In some implementations, the optimization problem is solved to minimize the total communication cost. For example, in one embodiment, the receding horizon state estimator is configured to solve a mixed integer optimization problem to determine the subset of external sensors for each time step. Examples of mixed integer optimization solvers include a branch and bound method.

In alternative embodiments, to reduce the computational efforts, the receding horizon state estimator solves the optimization problem to reduce the total communication cost with a heuristic approximation of minimization of the total communication cost while satisfying the constraint on state accuracy for each time step of prediction horizon. Examples of heuristic approximation include a greedy subtraction heuristic, a greedy addition heuristic, and a random heuristic.

Some embodiments are based on understanding that for using a heuristic approximation, in addition to communication cost of each external sensor, it is beneficial to know a dependence of an accuracy of the state estimation on measurements of that external sensor. For example, an external sensor with smaller communication cost but low ability in improving the accuracy of state estimation can be less useful for reducing the total communication cost while satisfying the constraint on state estimation than an external sensor with greater communication cost but higher ability to improve the accuracy.

To that end, in some embodiments, the receding horizon state estimator uses utilities of a set of external sensors to perform heuristic approximation of minimization of the total communication cost. As used herein, a utility of an external sensor is a function of a communication cost of receiving measurements of the external sensor and a dependence of an accuracy of the estimation of the state of the vehicle and other objects on the measurements of the external sensor. As used herein, the dependence of the accuracy of the estimation of the state of the vehicle and other objects on the measurements of the external sensor is a difference between the accuracy of the state determined using the measurements of the external sensor and the accuracy of the state determined without the measurements of the external sensor. For example, the utility can be a ratio of the dependence of accuracy to the communication cost.

In some embodiments, each external sensor is associated with utility to facilitate the selection of the subset of external sensors to reduce the total communication cost while satisfying the constraint on accuracy of state estimation. To ensure constraint satisfaction for each time step, in response to failing to satisfy the constraint of state estimation accuracy for a time step with external measurements of the entire set of corresponding external sensors, the heuristic approximation back-steps to expand the subset of external sensors determined for the previous time step.

For example, in one embodiment, the receding horizon state estimator, upon receiving the constraint on state accuracy, is configured to iteratively remove external sensors from the subset of external sensors in a reverse order of their utility until a prediction of the accuracy of estimation of the state of the vehicle using the measurements of the subset of external sensors satisfies the constraint on state accuracy. In alternative embodiment, the state observer, upon receiving the constraint on state accuracy, is configured to iteratively add external sensors in the subset of external sensors in an order of their utility until a prediction of the accuracy of estimation of the state of the vehicle using the measurements of the remaining external sensors satisfies the constraint on state accuracy.

In various embodiments, the constraint on state estimation accuracy bounds an error between an actual state of the vehicle and estimated state of the vehicle. For example, in one embodiment, the constraint on state estimation accuracy for a time step is a predetermined constant. In alternative embodiment, the constraint on state estimation accuracy for a time step is received from a controller for controlling the vehicle. Additionally, or alternatively, in one embodiment, the receding horizon state estimator is configured to estimate the constraint based on a distance to the nearest obstacle. For example, the receding horizon state estimator determines a distance between a vehicle and the nearest obstacle to a movement of the vehicle at each time step and determines the constraint on state estimation accuracy for a time step as a function of the distance determined for the time step. For example, the constraint on state estimation accuracy can be a specific fraction of the determined distance.

Accordingly, one embodiment discloses a receding horizon state estimator for estimating a state of a vehicle based on a prediction horizon, wherein, during an operation, the receding horizon state estimator is connected to internal sensors for providing internal measurements over internal communication channel and connected to external sensors for providing external measurements over shared communication channel. The receding horizon state estimator includes an input interface configured to accept configuration of a set of external sensors accessible for each time step of the prediction horizon and a constraint on state estimation accuracy for each time step of the prediction horizon; a processor configured to (1) select, for each time step of the prediction horizon, a subset of a corresponding set of external sensors accessible for a corresponding time step with external measurements sufficient to estimate the state of the vehicle that satisfies the constraint on state estimation accuracy for the corresponding time step while reducing a total communication cost of acquiring the external measurements over the prediction horizon, wherein a state estimation accuracy for a time step is a function of a previous state estimation accuracy for a previous time step; (2) request the external measurements from the subset of external sensors determined for a current time step; and (3) estimate the state of the vehicle using the internal measurements of the internal sensors and the requested external measurements of the subset of external sensors determined for the current time step; and an output interface configured to output the state of the vehicle for the current time step.

Another embodiment discloses a method for estimating a state of a vehicle based on a prediction horizon, wherein the method uses a processor operatively connected to internal sensors for providing internal measurements over internal communication channel and operatively connected to external sensors for providing external measurements over shared communication channel, wherein the processor is coupled with stored instructions implementing the method, wherein the instructions, when executed by the processor carry out steps of the method, that includes accepting configuration of a set of external sensors for each time step of the prediction horizon and a constraint on state estimation accuracy for each time step of the prediction horizon; selecting, for each time step of the prediction horizon, a subset of a corresponding set of external sensors with external measurements sufficient to estimate the state of the vehicle that satisfies the constraint on state estimation accuracy for a corresponding time step while reducing a total communication cost of acquiring the external measurements over the prediction horizon, wherein a state estimation accuracy for a time step is a function of a previous state estimation accuracy for a previous time step; requesting the external measurements from the subset of external sensors determined for a current time step; estimating the state of the vehicle using the internal measurements of the internal sensors and the requested external measurements of the subset of external sensors determined for the current time step; and outputting the state of the vehicle for the current time step.

BRIEF DESCRIPTION OF THE DRAWINGS

FIGS. 4A, 4B, 4C, and 4D show a schematic of exemplar usage of a receding horizon state estimator arranged at a roadside unit according to one embodiment.

DETAILED DESCRIPTION

System Overview

Figure 1A:
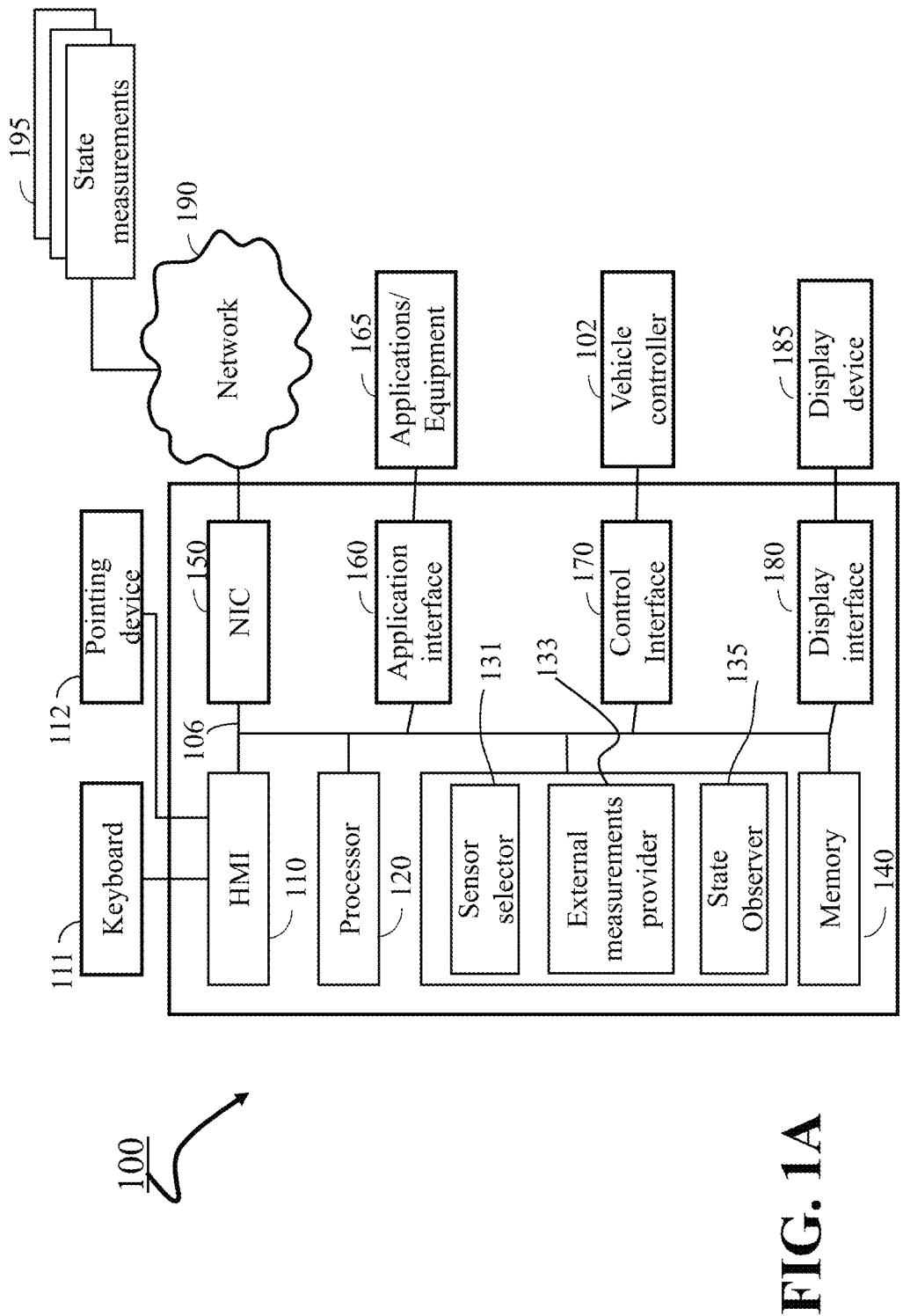
FIG. 1A and FIG. 1B show block diagrams of a receding horizon state estimator 100 for estimating a state of a vehicle based on a prediction horizon according to some embodiments.
Figure 1B:
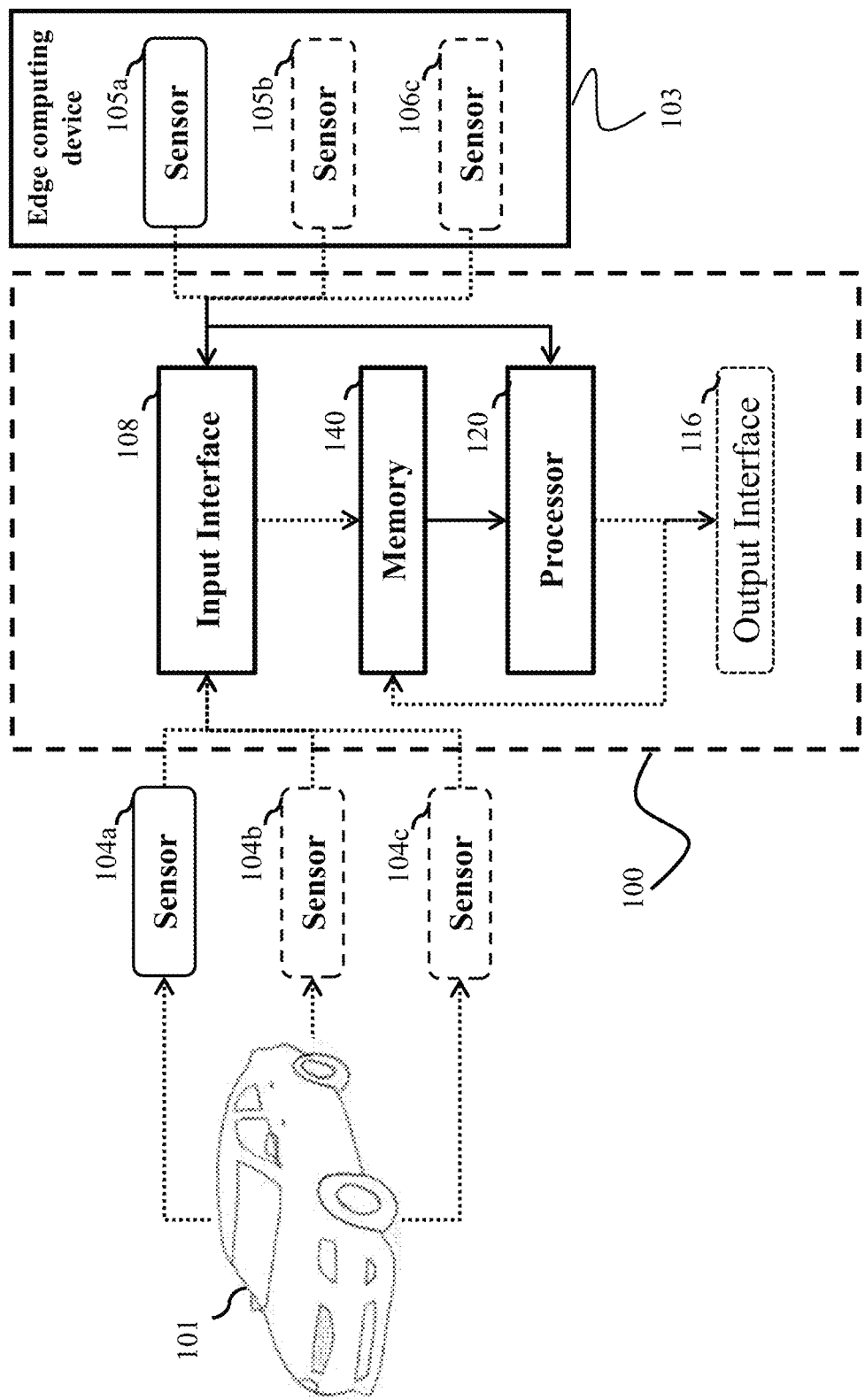

FIG. 1A and FIG. 1B show block diagrams of a receding horizon state estimator 100 for estimating a state of a vehicle 101 based on a prediction horizon according to some embodiments. The receding horizon state estimator borrows some principles of model predictive controller (MPC) to select a subset of external sensors for each time step based on an iterative, finite prediction horizon optimization of a cost function that describes a total communication cost of acquiring the external measurements over the prediction horizon while satisfying constraint on state estimation accuracy for each time step of prediction horizon. In such a manner, the receding horizon state estimator has the ability to anticipate future events in selecting the subset of external sensors for each time step to ensure consistent constraints satisfaction while reducing the communication cost of external measurement.

During an operation, the receding horizon state estimator 100 is connected to internal sensors for providing internal measurements over internal communication channel and connected to external sensors for providing external measurements over shared communication channel Examples of internal communication include wired communication over wires and short-range wireless communication over private wireless protocols such as Bluetooth. Examples of shared communication include various communication over radio wireless channels, such as communications using various vehicle communication standards, such as vehicle-to-everything (V2X) standard of communication for passing of information from a vehicle to any entity that may affect the vehicle, and vice versa. Other types of vehicle communication standards include V2I (vehicle-to-infrastructure), V2N (vehicle-to-network), V2V (vehicle-to-vehicle), V2P (vehicle-to-pedestrian), V2D (vehicle-to-device) and V2G (vehicle-to-grid).

In this disclosure, the notation of the external and/or internal sensor depends on the location of the state estimator and can vary for different applications, e.g., based on the location of the state estimator 100. For example, when the state estimator 100 is executed by a processor of a vehicle 101, the sensors of the vehicle, such as sensors 104a, 104b, and 104c, are internal sensors, while sensors 105a, 105b, and 105c of other vehicles or roadside assisting units are external sensors. In contrast, when the state estimator is implemented by an edge computing device 103 of a roadside assisting unit, the sensors 105a, 105b, and 105c of the roadside unit are internal sensors, while the sensors of vehicles including sensors 104a, 104b, and 104c of the vehicle 101 for which the state is estimated are external sensors.

The receding horizon state estimator 100 is configured to estimate a state of a vehicle with a desired accuracy using at least some measurements from internal and external sensors. Additionally, or alternatively, the receding horizon state estimator 100 is configured to provide such a state estimation that can reduce a cost of communicating measurements of external sensor over wireless communication links for a current time step while maintaining a desired accuracy of state estimation for future time steps.

To that end, the state estimator 100 can have a number of input 108 and output 116 interfaces connecting the state estimator 100 with other systems and devices. For example, a network interface controller 150 is adapted to connect the state estimator 100 to the internal sensors through the buses 106. In addition, the network interface controller 150 is adapted to connect the state estimator 100 to the external sensors through a wireless network 190. Through the network 190 and through the buses 106, the state estimator 100 can receive input signal 195 indicative of a state of the vehicle 101 and its surroundings. The measurements of the input signal 195 are measurements from one or a combination of sensors 104a, 104b, 104c, 105a, 105b, and 105c or data derived from the measurements. Examples of state measurements 195 include location, velocity and acceleration measurements, orientation measurements, and color and depth images.

Additionally, the input interface 108 is configured to accept one or combination of configuration of a set of external sensors for current and future time steps of the prediction horizon, configuration of internal sensors for current and future time steps of the prediction horizon, and a constraint on state estimation accuracy for each time step, and any other operative information. For example, in some implementations, a human machine interface 110 within the state estimator 100 connects the state estimator to a keyboard 111 and pointing device 112, wherein the pointing device 112 can include a mouse, trackball, touchpad, joy stick, pointing stick, stylus, or touchscreen, among others. Through the interface 110 or NIC 150, the state estimator 100 can receive data, such as state measurements 195.

The state estimator 100 includes an output interface 116 configured to output the results of the state estimation of a current time step. As used herein, a current time step is a step for which the knowledge of the state is desired. Typically, the current time step is the first time step in the prediction horizon.

In some applications, the receding horizon state estimator is operatively connected 170 to a controller 102 for controlling the vehicle. In these applications, each time step can coincide with or correspond to a control step of a controller, such that the current time step determines state of the vehicle for the next control step. For example, the receding horizon state estimator can receive the constraint on state estimation accuracy for each time step of the prediction horizon from a controller controlling a movement of the vehicle, and can submit the state of the vehicle for the current time step to the controller.

For example, the output interface can include a memory to render the results of state estimation. For example, the state estimator 100 can be linked through the bus 106 to a display interface 180 adapted to connect the state estimator 100 to a display device 185, such as a computer monitor, camera, television, projector, or mobile device, among others. The state estimator 100 can also be connected to an application interface 160 adapted to connect the system to different applications and/or equipment 165 for performing various operations. The state estimator 100 can also be connected to a control interface 170 adapted to connect the system to the controller 102 configured to control the movement of the vehicle 101 based on estimated state.

The state estimator 100 includes a processor 120 configured to execute stored instructions, as well as a memory 140 that stores instructions that are executable by the processor. The processor 120 can be a single core processor, a multi-core processor, a computing cluster, or any number of other configurations. The memory 140 can include random access memory (RAM), read only memory (ROM), flash memory, or any other suitable memory systems. The processor 120 is connected through the bus 106 to one or more input and output devices. These instructions implement a method for estimating a state of a vehicle 101 based on a prediction horizon according to some embodiments.

To that end, the state estimator 100 includes a sensor selector 131 module configured to select, for each time step of the prediction horizon, a subset of a corresponding set of external sensors with external measurements sufficient to estimate the state of the vehicle that satisfies the constraint on state estimation accuracy for a corresponding time step while reducing a total communication cost of acquiring the external measurements over the prediction horizon, wherein a state estimation accuracy for a time step is a function of a previous state estimation accuracy for a previous time step.

In such a manner, at different time steps, different subsets of external sensors can be used to minimize communication cost while ensuring satisfaction of constraints on state estimation accuracy. However, if the communication cost minimization is performed for each time step individually, i.e., independently from at least some other time steps, such a minimization can lead to violation of constraints on state estimation accuracy and/or suboptimal total communication cost over a time period. For example, if the accuracy of the state at the current time step is reduced without consideration of the accuracy required in the future, when there is a sudden increase in the desired accuracy for a subsequent time step, such a desired accuracy may not be achieved even with the entire set of external measurements. Similar problem may exist when there is a sudden decrease in availability of external measurements. In addition, joint variance in the required accuracy and availability of the external measurements may make this problem even more severe.

To that end, the sensor selector 131 selects the subset of external sensor for each time step of prediction horizon by optimizing of a cost function that describes a total communication cost of acquiring the external measurements over the prediction horizon while satisfying constraint on state estimation accuracy for each of time step of prediction horizon. In effect, the sensor selector 131 anticipates future events in selecting the subset of external sensors for each time step to ensure consistent satisfaction of constraints on state accuracy estimation while reducing the communication cost of external measurement.

In addition, and also in accordance with some MPC principles, after selecting a subset of external sensors for each time step, the external measurements from the subset of external sensors selected for a current time step are requested and the state of the vehicle is estimated using the internal measurements of the internal sensors and the requested external measurements of the subset of external sensors determined for the current time step. After the state for the current time step is determined, the prediction horizon is shifted in time and the receding horizon state estimation is repeated until necessary. To that end, the receding horizon state estimator 100 includes an external measurements provider 133 module configured to request the external measurements, e.g., through NIC 150, from the subset of external sensors determined by the sensor selector 131 for a current time step. The receding horizon state estimator 100 also includes a state observer 135 module configured to estimate the state of the vehicle using the internal measurements of the internal sensors and the requested external measurements of the subset of external sensors determined for the current time step.

Some embodiments are based on recognition that a maximum possible accuracy of a vehicle is an accuracy of a state estimated with measurements of all internal and external sensors available to a state estimator. However, the state of the vehicle can be determined not with the maximum possible accuracy, but with an accuracy sufficient for a vehicle in a specific situation. For example, the accuracy may depend on the target accuracy of control of the vehicle. Moreover, some embodiments are based on recognition that different time varying situations can call for different accuracy. In other words, the desired accuracy of state estimation can vary for different time steps.

In some embodiments, the required accuracy of estimation of the state of the vehicle and other objects depends on the required accuracy of control of the vehicle and is determined with respect to how far the vehicle is from the objects. For example, if the vehicle is close to the objects, higher accuracy in the estimation is required to prevent imminent collisions with the objects. For example, if a vehicle is far away from other vehicles, a controller of the vehicle can tolerate large estimation errors without causing any collision. However, when another vehicle approaches or when the vehicle performs a maneuver like a lane change or a turn, the controller needs to use more accurate state estimation. Hence, the required accuracy varies over time according to the changing environment.

Additionally, or alternatively, some embodiments are based on recognition that different combinations of external sensors can be available for a state estimator at different time steps. For example, a vehicle may be passing along different roadside assistance units having different sensor configuration. In another example, a vehicle may be in a neighborhood of a different kinds of vehicles that in addition to roadside assisting unit may provide external measurements. In these examples, the desired state accuracy may remain constant, while the number of different external sensors varies over time. For example, the desired accuracy of state estimation can be a predetermined parameter. Additionally, or alternatively, different time varying situations can call for both different accuracy and usage of different combination of external sensors.

Armed with this understanding, some embodiments are based on realization that this flexibility of the desired accuracy and/or flexibility of combination of external sensors can be used to reduce communication cost of transmitting the external measurements of the external sensors. For example, the state of the vehicle and other objects surrounding the vehicle can be determined with internal measurements of internal sensors, while the measurements of external sensors can be requested only when needed to further improve the accuracy of the state.

Moreover, in some situations, there is no need to request measurements from all available external sensors, but only from a subset of external sensors needed to achieve the desired accuracy.

In such a manner, at different time steps, different subsets of external sensors can be used to minimize communication cost while ensuring satisfaction of constraints on state estimation accuracy. However, some embodiments are based on realization that if the communication cost minimization is performed for each time step individually, i.e., independently from at least some other time steps, such a minimization can lead to violation of constraints on state estimation accuracy in a subsequent time step and/or suboptimal total communication cost over a time period.

Specifically, some embodiments are based on understanding that there is a relationship between the accuracy of the state estimated at a current time step and maximum possible accuracy of state estimation for a subsequent time step. This is because the increase of the accuracy is bounded from one-time step into another. Hence, if the accuracy of the state at the current time step is reduced without consideration of the accuracy required in the future, when there is a sudden increase in the desired accuracy for a subsequent time step, such a desired accuracy may not be achieved even with the entire set of external measurements. Similar problem may exist when there is a sudden decrease in availability of external measurements. In addition, joint variance in the required accuracy and availability of the external measurements may make this problem even more severe.

To that end, in some embodiments, the sensor selector 131 module of the receding horizon state estimator 100 is configured to solve a mixed integer optimization problem to determine the subset of external sensors for each time step of the prediction horizon reducing the total communication cost over the prediction horizon subject to the constraint on state estimation accuracy for each time step of the prediction horizon. The embodiments are based on understanding that the optimization problem for external sensor selection can be formulated as a mixed integer optimization problem because the selection of a particular external sensor at each time step is binary, the particular external sensor is either selected to a subset of external sensors for state estimation or not.

Figure 1C:
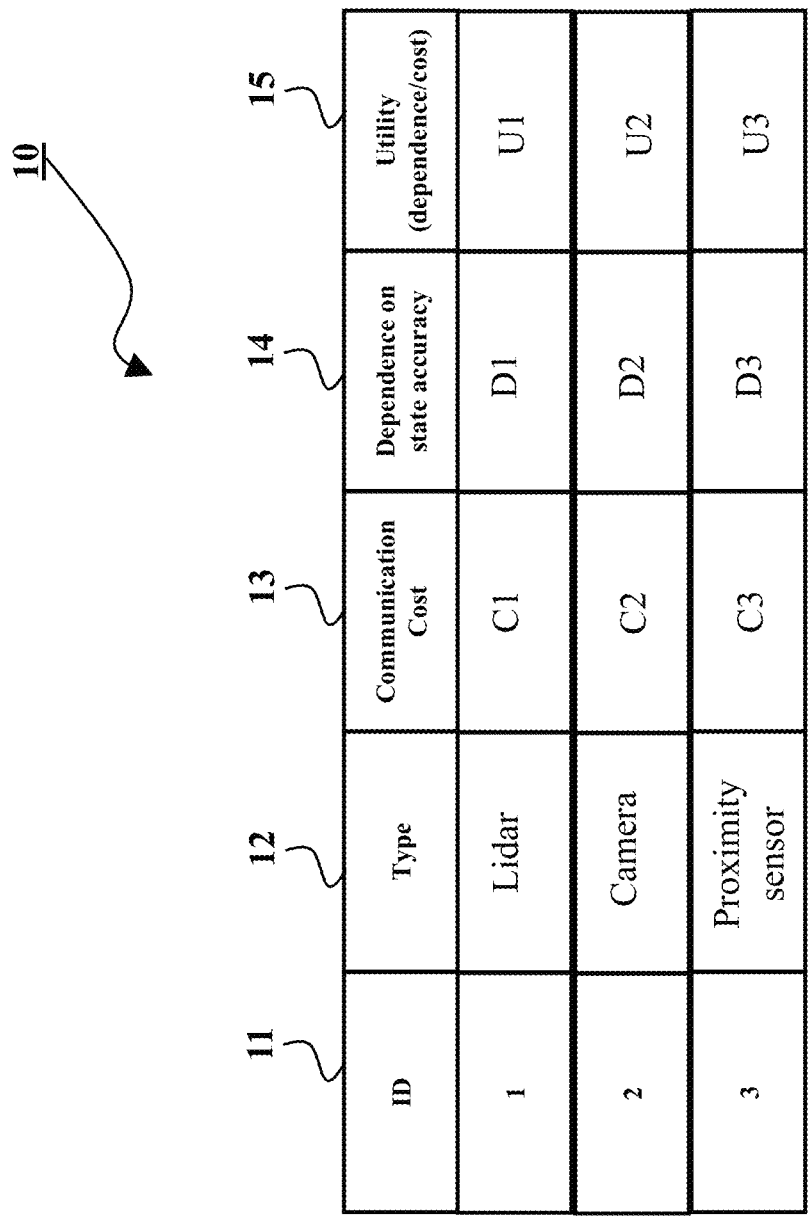
FIG. 1C shows an example of a configuration table maintained by the receding horizon state estimator according to some embodiments.

FIG. 1C shows an example of a configuration table 10 maintained by the receding horizon state estimator according to some embodiments. Such a table simplifies update of configuration of external sensor for each time step. Using this table only identification numbers 11 unique for each type 12 of external sensors can be provided to state estimator 100.

For example, for solving mixed integer problem, the configuration of the external sensors for each time step includes a communication cost 13 of each external sensor for the corresponding time step. The communication cost 13 is sufficient to solve the mixed integer problem optimally. However, to perform a receding horizon optimization, a mixed-integer (MI) program needs to be solved at each time step of prediction horizon. Number of solvers, such as a solver using a branch and bound method, employed by different embodiments of state estimator 100. However, such solvers need to solve a difficult combinatorial task, because mixed-integer programming is NP-hard in general.

To that end, in some embodiments, the receding horizon state estimator is configured to reduce the total communication cost using a heuristic approximation of minimization of the total communication cost while satisfying the constraint on state accuracy for each time step. Initially, the heuristic approximation minimizes communication cost for each time step independently. However, to ensure constraint satisfaction, the heuristic approximation, in response to failing to satisfy the constraint of state estimation accuracy for a time step with external measurements of the entire set of corresponding external sensors, back-steps to expand the subset of external sensors determined for the previous time step. In effect, the heuristic approximation reduces computational complexity while still ensuring constraints satisfaction. Examples of the heuristic approximation includes one or combination of a greedy subtraction heuristic, a greedy addition heuristic, and a random heuristic.

Some embodiments are based on understanding that for using a heuristic approximation, in addition to communication cost 13 of each external sensor, it is beneficial to know a dependence 14 of an accuracy of the state estimation on measurements of that external sensor. For example, an external sensor with smaller communication cost but low ability in improving the accuracy of state estimation can be less useful for reducing the total communication cost while satisfying the constraint on state estimation than an external sensor with greater communication cost but higher ability to improve the accuracy.

To that end, in some embodiments, the receding horizon state estimator uses utilities 15 of a set of external sensors to perform heuristic approximation of minimization of the total communication cost. As used herein, a utility of an external sensor is a function of a communication cost 13 of receiving measurements of the external sensor and a dependence 14 of an accuracy of the estimation of the state of the vehicle and other objects on the measurements of the external sensor. As used herein, the dependence of the accuracy of the estimation of the state of the vehicle and other objects on the measurements of the external sensor is a difference between the accuracy of the state determined using the measurements of the external sensor and the accuracy of the state determined without the measurements of the external sensor. For example, the utility can be a ratio of the dependence of accuracy to the communication cost.

In some embodiments, each external sensor is associated with utility to facilitate the selection of the subset of external sensors to reduce the total communication cost while satisfying the constraint on accuracy of state estimation. To ensure constraint satisfaction for each time step, in response to failing to satisfy the constraint of state estimation accuracy for a time step with external measurements of the entire set of corresponding external sensors, the heuristic approximation back-steps to expand the subset of external sensors determined for the previous time step.

For example, in one embodiment, the receding horizon state estimator, upon receiving the constraint on state accuracy, is configured to iteratively remove external sensors from the subset of external sensors in a reverse order of their utility until a prediction of the accuracy of estimation of the state of the vehicle using the measurements of the subset of external sensors satisfies the constraint on state accuracy. In alternative embodiment, the state observer, upon receiving the constraint on state accuracy, is configured to iteratively add external sensors in the subset of external sensors in an order of their utility until a prediction of the accuracy of estimation of the state of the vehicle using the measurements of the remaining external sensors satisfies the constraint on state accuracy.

Figure 2A:
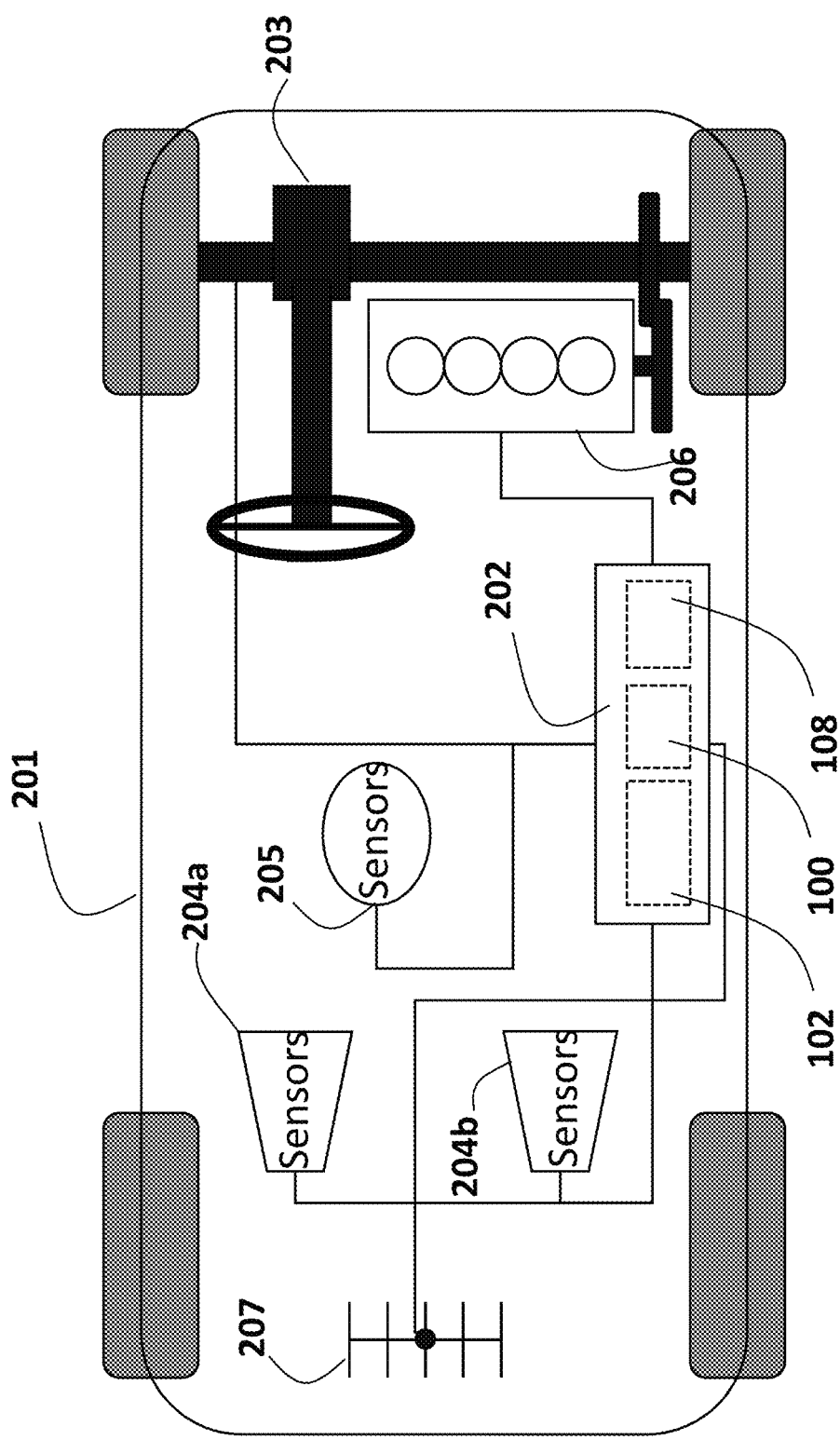
FIG. 2A shows a schematic of a vehicle including a receding horizon state estimator employing principles of some embodiments.

FIG. 2A shows a schematic of a vehicle including a receding horizon state estimator employing principles of some embodiments. For example, a vehicle 201 includes a control unit 202, which contains a controller 102 and a receding horizon state estimator 100. As used herein, the vehicle 201 can be any type of wheeled vehicle, such as a passenger car, bus, or rover. Also, the vehicle 201 can be an autonomous or semi-autonomous vehicle. Examples of the motion of the vehicle 201 include lateral motion of the vehicle controlled by a steering system 203 of the vehicle 201. The steering system 203 is controlled by the controller 102.

The vehicle can also include an engine 206, which can be controlled by the controller 102 or by other components of the vehicle 201. Examples of the controller are PID control, Linear-Quadratic Regulator (LQR), h2/h-infinity control, and Model Predictive Control (MPC). The vehicle 201 can also include one or more sensors 205 to sense, by non-limiting examples, its current motion quantities and internal status. Examples of the sensors 205 can include global positioning system (GPS), accelerometers, inertial measurement units, gyroscopes, shaft rotational sensors, torque sensors, deflection sensors, pressure sensor, and flow sensors. The vehicle can also include one or more other sensors 204a, 204b to sense the surrounding environment. Examples of the sensors 204a, 204b can include distance range finders, radars, lidars, and cameras. The sensors 204a, 204b, and 205 are referred to as internal sensors or sensors internal to the vehicle. The receding horizon state estimator 100 of the vehicle 201 receives the measurements of the internal sensors through wired communication links via an input interface 108.

Still referring to FIG. 2A, the vehicle 201 is equipped with a transceiver 207 enabling communication capabilities of the control unit 202 through wireless communication links via an input interface 108. The transceiver 207 enables the vehicle 201 to receive information about the surrounding environment. The vehicle 201 receives, using the transceiver 207, the measurements of sensors external to the vehicle 201. Sensors external to the vehicle 201 are same as sensors 204a and 204b but embedded outside the vehicle 201, for example, in other traffic participants, such as vehicles, pedestrians, bicyclists, and other roadside units. Also, the transceiver 207 enables the vehicle 201 to request the measurements of the external sensors.

Figure 2B:
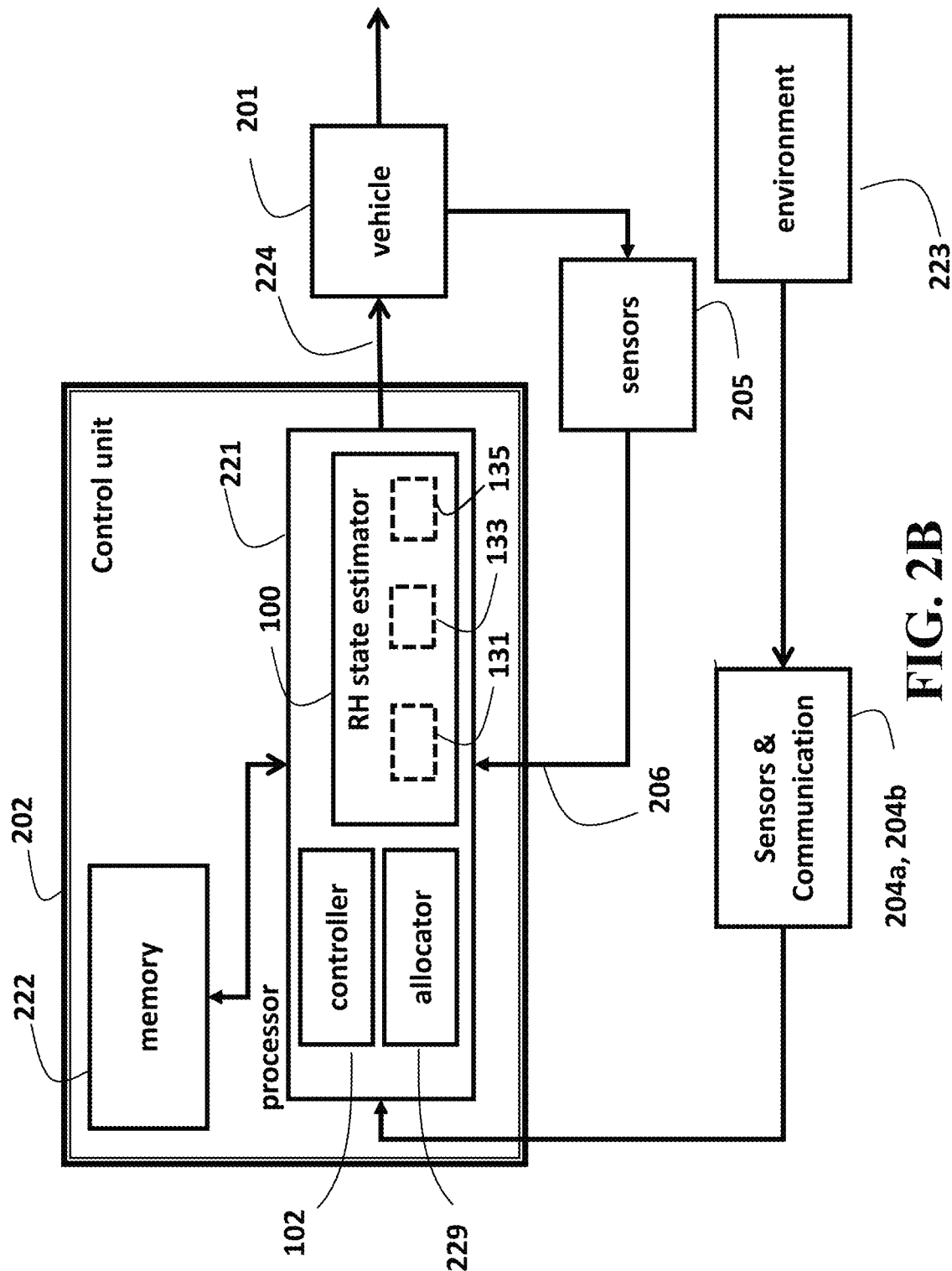
FIG. 2B shows a block diagram of a control unit of FIG. 2A according to some embodiments.

FIG. 2B shows a block diagram of a control unit 202 of FIG. 2A according to some embodiments. The control unit 202 includes a hardware processor 221 connected to a memory 222, e.g., a non-transitory computer readable medium. In some implementations, the memory 222 stores information about the vehicle, a program for controlling the vehicle, motion models of the traffic, specifications of the internal sensors, specifications of external sensors obtained from wireless communication links, and constraints of the estimation accuracy of the state of the vehicle 201 and the surrounding environment.

The processor 221 can be any computational device capable of performing computations, and can include one or many physical devices of the same or of different types. It is possible that the processor 221 can include multiple computational devices, e.g., microprocessors. Similarly, the memory 222 can be any logical memory and/or non-transitory computer readable storage medium capable of storing information, and can include one or more physical information storage means, of the same or of different types. The processor 221 allows the computation required by a controller 102, a constraint allocator 209, and the receding horizon state estimator 100. The controller 102 estimates control commands 224 that change the motion of the vehicle 201. The constraint allocator 209 computes required constraints on the accuracy of the estimation of the state of the vehicle 201 and other objects surrounding the vehicle in dependence on predicted motions of the vehicle in the environment 223.

The receding horizon state estimator can be embedded in a roadside unit. For example, a roadside unit can be equipped with a control unit 102, sensors 204a, 204b that sense the surrounding environment, and transceiver 207. Same as a control unit of the vehicle 201, the controller 102 of the roadside unit results in control commands 224 that change the motions of vehicles in vicinity of the roadside unit, and the receding horizon state estimator 100 selects a subset of external sensors whose measurements are sufficient to satisfy constraints on the state estimation accuracy, and estimates the state of vehicles surrounding the roadside unit, based on the data from its internal sensors and the subset of external sensors that are located in other traffic participants, determined by the sensor selector 131 and communicated through the transceiver 207.

FIGS. 3A, 3B, 3C, 3D, and 3E show a schematic of exemplar usage of a receding horizon state estimator 100 arranged at a controlled vehicle according to one embodiment. In one example, a control unit 202 embedded in a vehicle 301 controls the motion of the vehicle 301 to maintain a distance ($\Delta p$) from a lead vehicle 302. The receding horizon state estimator 100 needs to estimate the state of the vehicle 301 and the lead vehicle 302, using sensors internal to the vehicle 301 and sensors external to the vehicle 301. Sensors external to the vehicle 301 are sensors embedded on the lead vehicle 302 and sensors embedded on a roadside unit 303. The vehicle 301 is aware of specifications (e.g., noise characteristics) of the external sensors embedded on the lead vehicle 302 and roadside unit 303. The vehicle 301 can request the measurements of the external sensors, and the measurements of the external sensors can be transmitted to the vehicle 301 via wireless communication channels.

Using all the measurements of the internal and external sensors, the state of the vehicles 301 and 302 can be most accurately estimated. The estimated state is referred to herein as the state estimate. The state estimate is said to be accurate if it is close to the actual state. The state estimate should be within a sufficient accuracy bound. However, it is not always necessary to obtain the most accurate state estimate.

Figure 3A:
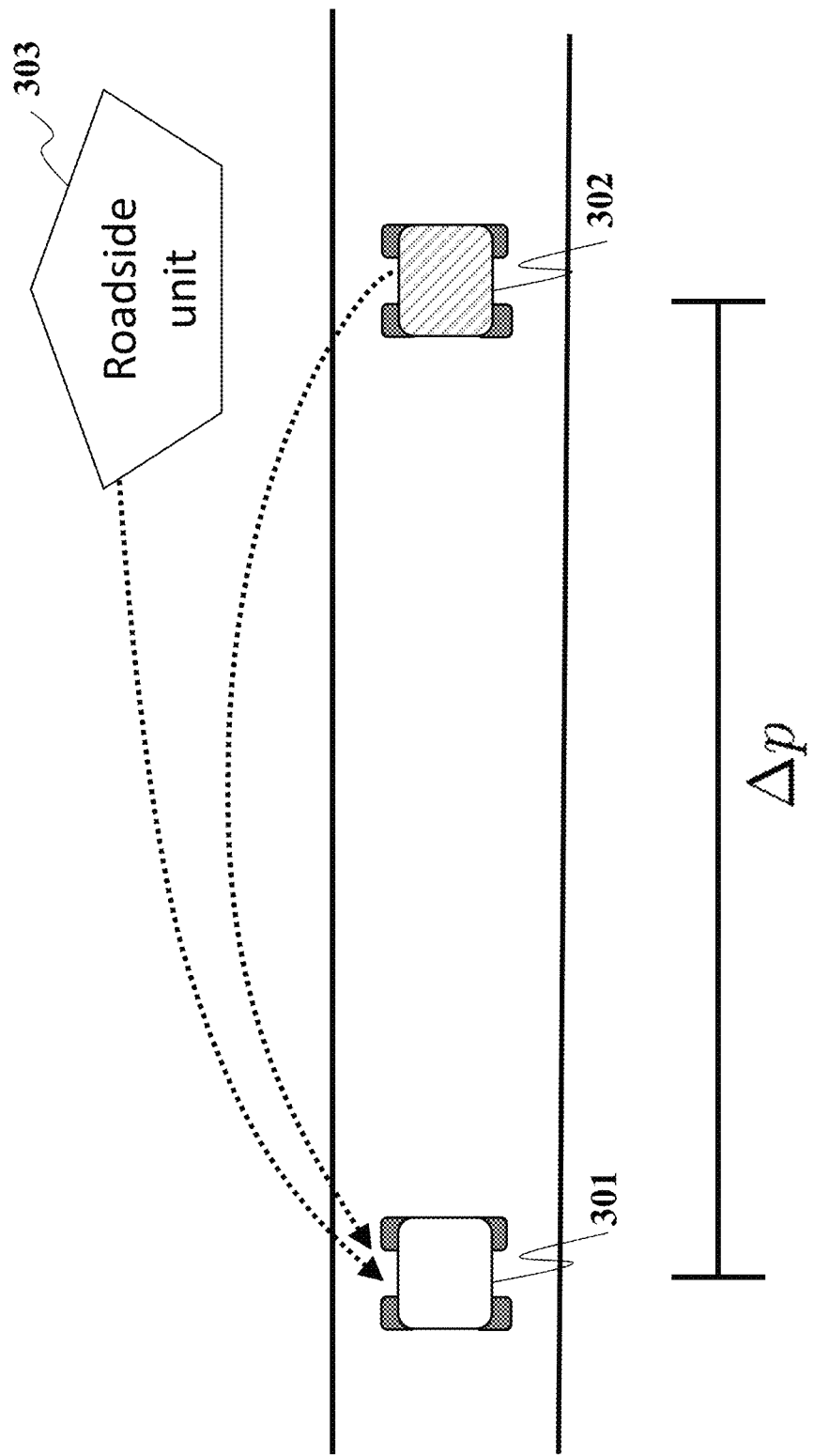
FIGS. 3A, 3B, 3C, 3D, and 3E show a schematic of exemplar usage of a receding horizon state estimator arranged at a controlled vehicle according to one embodiment.
Figure 3B:
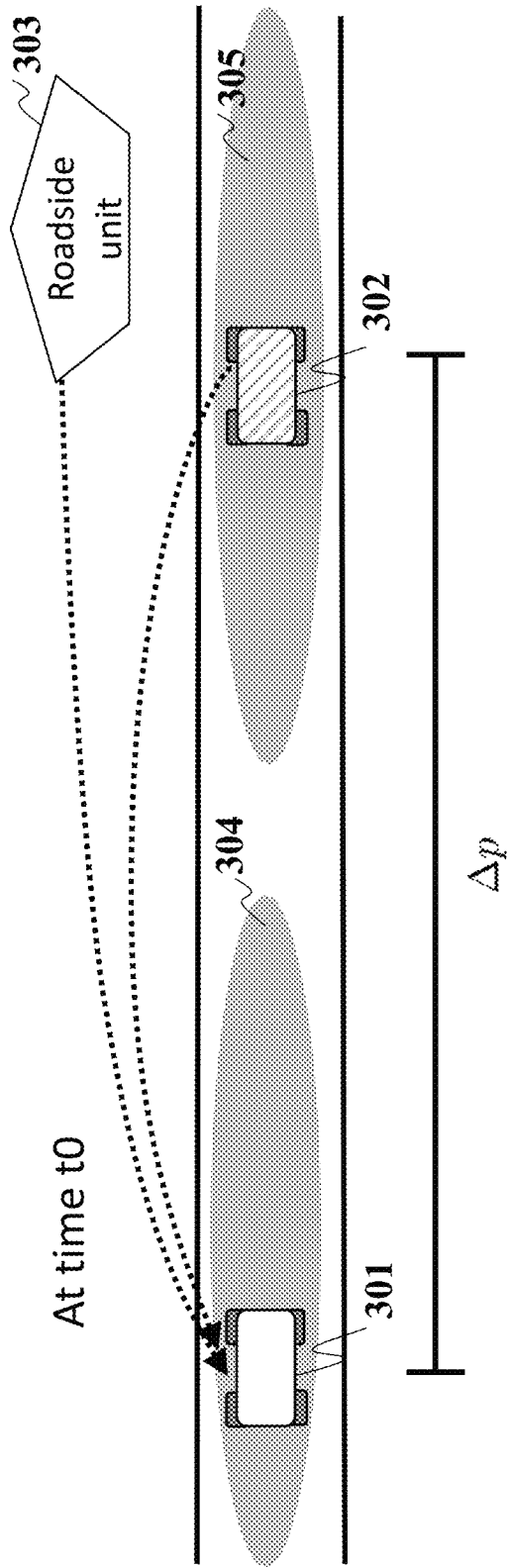

For example, as shown in FIG. 3B, when the vehicle 301 and lead vehicle 302 are far from each other, larger accuracy bounds 304 and 305 can be tolerated without causing any rear-end collision. The constraint allocator 229 computes desired accuracy bounds. For example, the constraint allocator 229 can estimate the accuracy bounds as a function of the distance between the vehicles 301 and 302. Some embodiments are based on the recognition that using the measurements of the internal sensors and only a subset of external sensors may be sufficient to obtain the state estimate within a desired accuracy bound.

In one embodiment, the measurements of the internal sensors and different combinations of external sensors are used to estimate the state of vehicles over a finite future control steps, wherein a time-varying accuracy bound of the state estimate forms a time-varying constraint of the state estimate. For example, FIG. 3B shows the current positions of the vehicle 301 and the lead vehicle 302, and an accuracy bound 304 and 305 of the state estimate of the vehicle 301 and the lead vehicle 302, respectively. At this current time t0, the state of the vehicle 301 and the lead vehicle 302 are predicted (e.g., given control commands) for different control steps 1,2, . . . , N. For each future time step, a combination of the external sensors is selected to estimate the state of the vehicles 301 and 302 within different accuracy bounds.

Figure 3C:
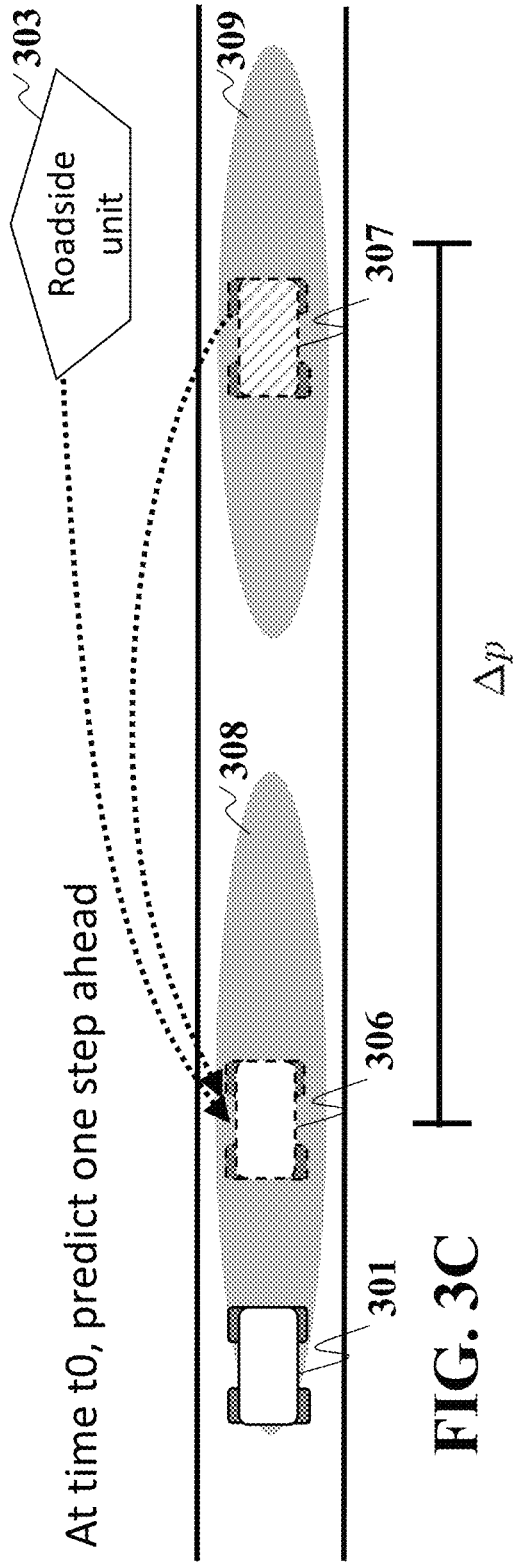
Figure 3D:
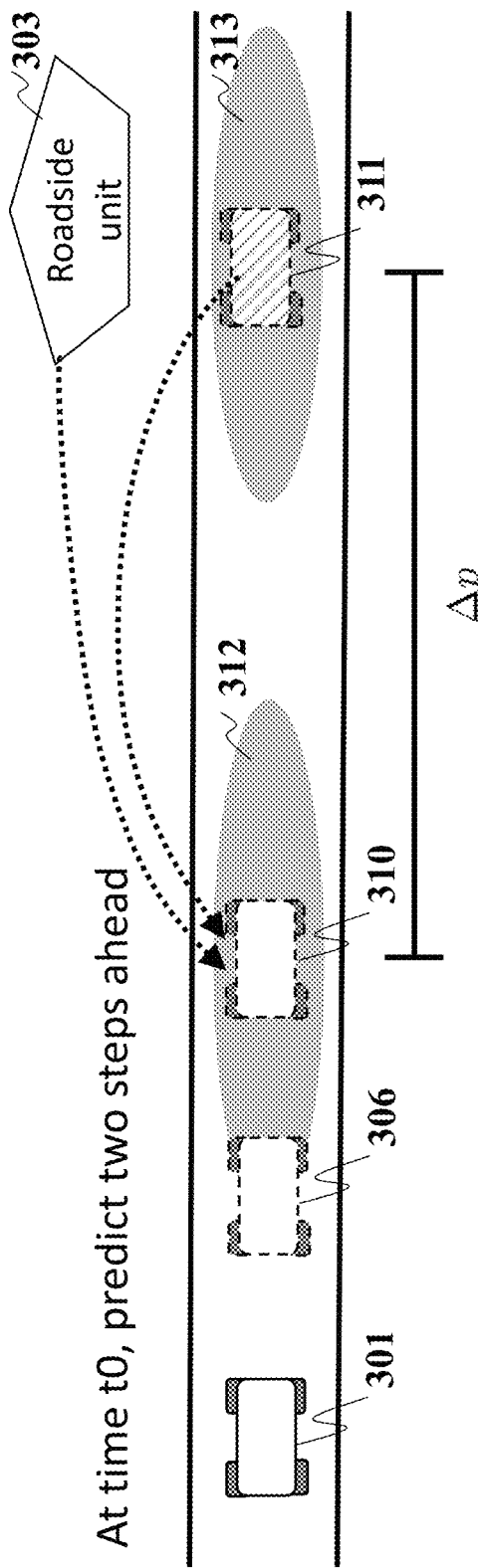
Figure 3E:
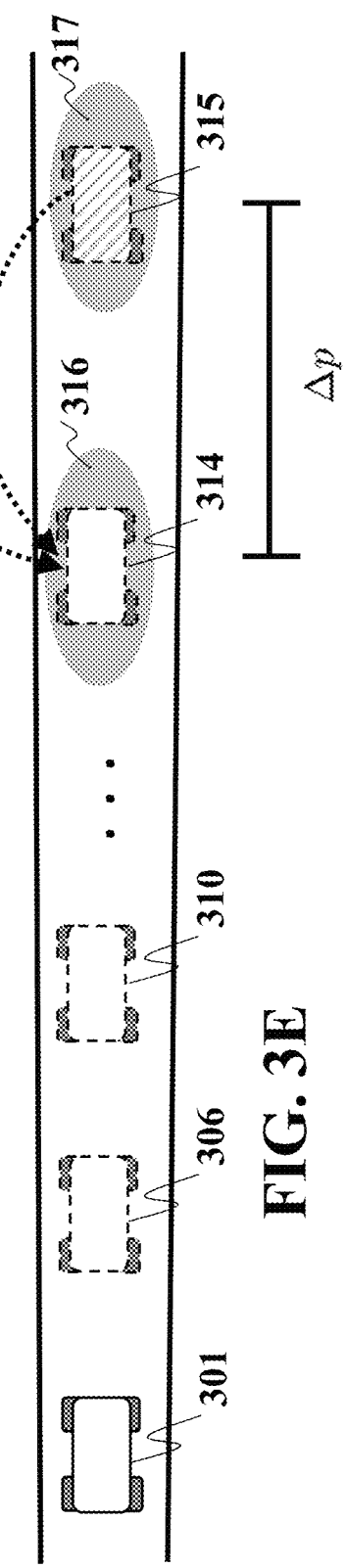

FIG. 3C shows the predicted states of the vehicles 306 and 307 at one step ahead. As the vehicles get closer to each other, more accurate bounds 308 and 309 should be required. Predicting two steps ahead, FIG. 3D shows the states of the vehicles 310 and 311 and required accuracy bounds 312 and 313. Predicting N steps ahead, FIG. 3E shows the states of the vehicles 314 and 315 and required accuracy bounds 316 and 317. The accuracy areas 316 and 317 are small, indicating that the state estimate should be more accurate, as the vehicles 314 and 315 will be very close at N control steps in the future. If the accuracy bounds 316 and 317 were of the same size as the accuracy bounds 304 and 305 in FIG. 3B, the state estimate might indicate that the vehicles 314 and 315 have already collided. Some embodiments of the present disclosure are a method of selecting a subset of external sensors at each future control step to obtain the state estimate that satisfies a given time-varying constraint using the measurements of the internal sensors and the subset of the external sensors.

FIGS. 4A, 4B, 4C, and 4D show a schematic of exemplar usage of a receding horizon state estimator 100 arranged at a roadside unit 401 according to one embodiment. A control unit in the roadside unit 401 is equipped with internal sensors, and can be communicated with external sensors embedded inside three vehicles 402, 403, and 404 through wireless communication links. The controller of the roadside unit 401 controls the motions of the vehicles 402, 403, and 404 to prevent collisions at the intersection. The state observer system of the roadside unit 401 estimates the states of the vehicles 402, 403, and 404 based on the measurements of the internal sensors and combinations of the external sensors.

Figure 4B:
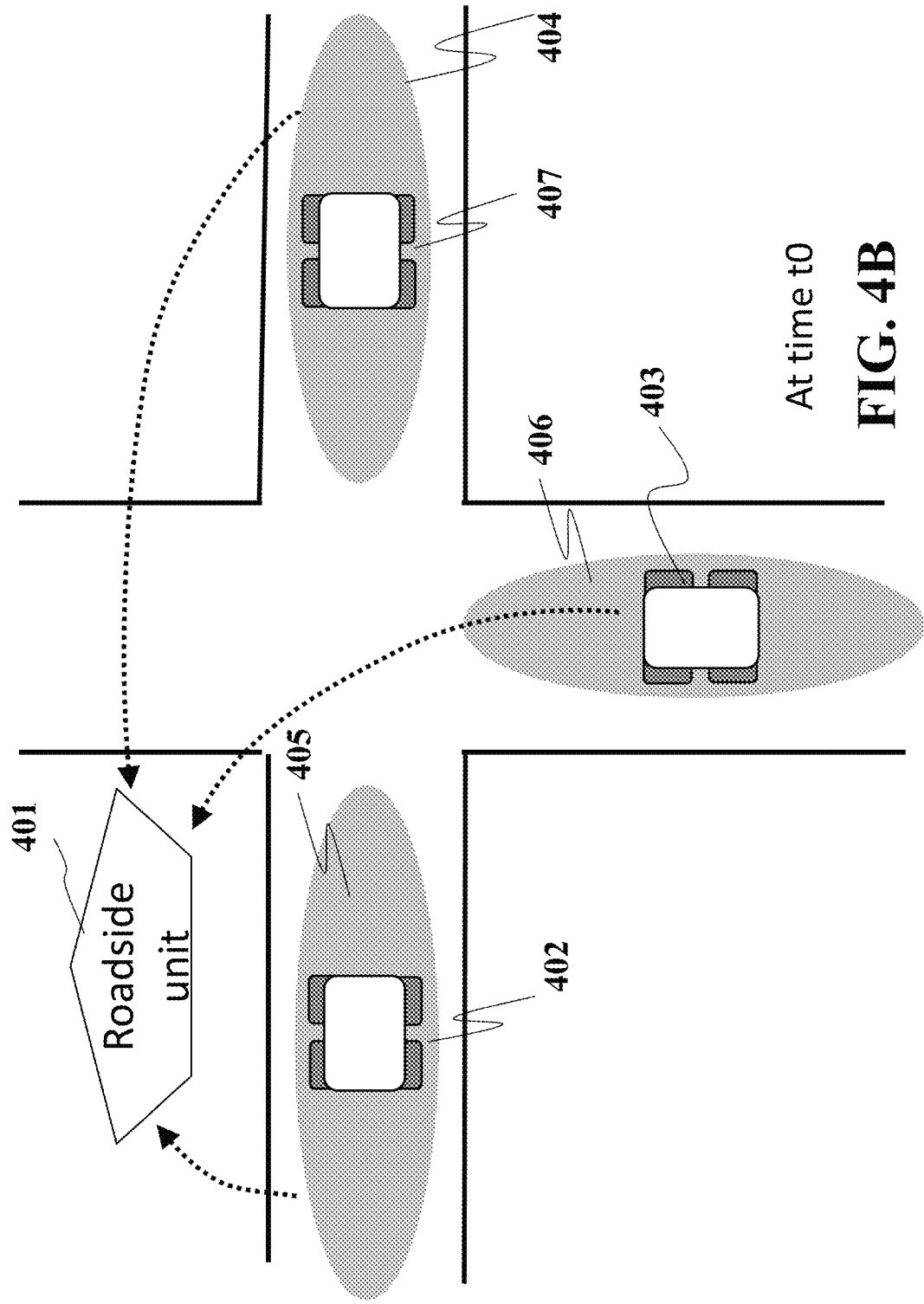
Figure 4D:
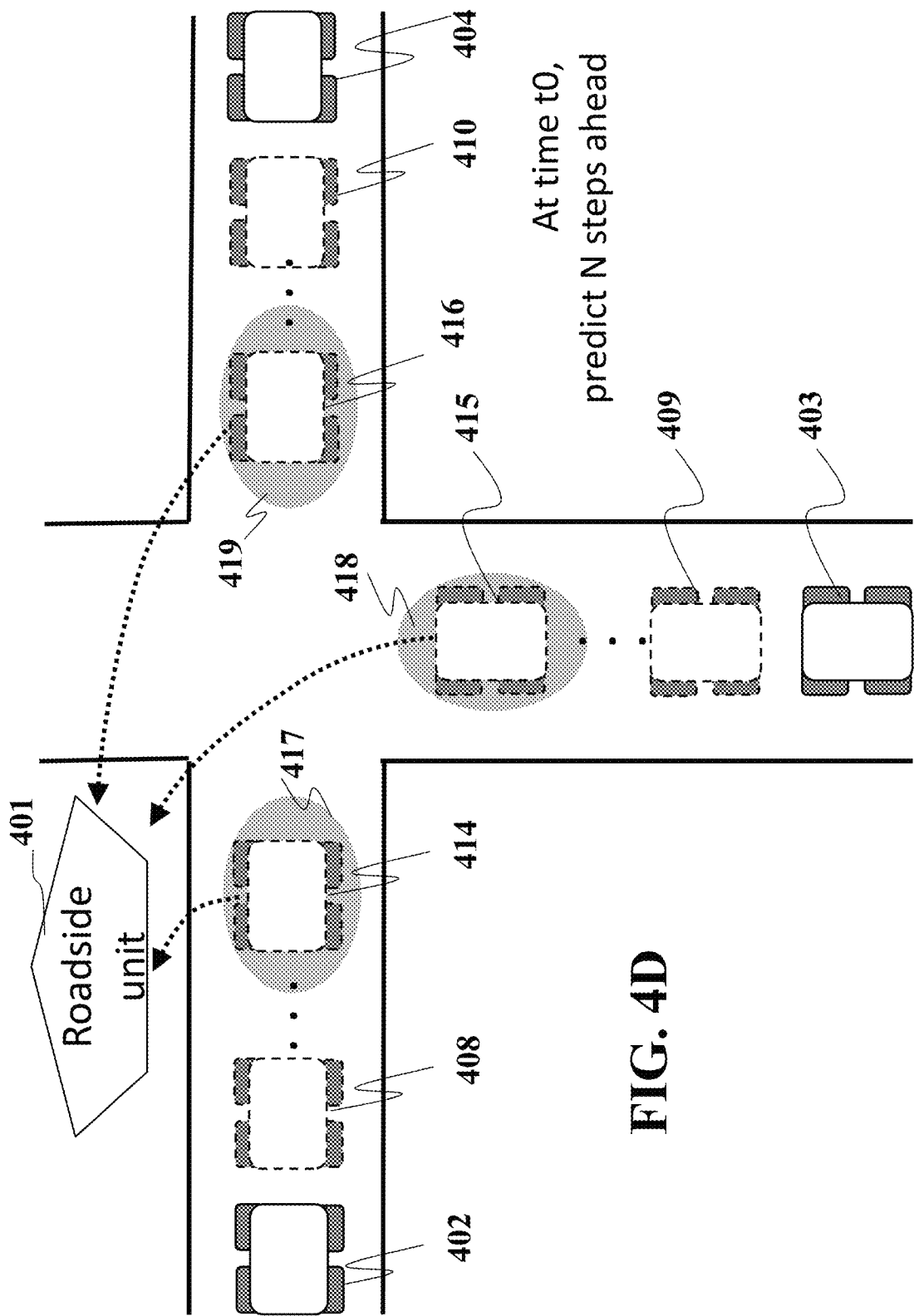

At the current time t0, FIG. 4B shows the current state of the vehicles 402, 403, and 404 and required accuracy bounds 405, 406, and 407. Predicting one step ahead, FIG. 4C shows the predicted state of the vehicles 408, 409, and 410 and required accuracy bounds 411, 412, and 413. Predicting N steps ahead, FIG. 4C shows the predicted states of the vehicles 414, 415, and 416 and corresponding required accuracy bounds 417, 418, and 419. Notice that as the vehicles approach the intersection, the accuracy bounds get tighter because otherwise it is possible that the estimated positions of the vehicles are all inside the intersection simultaneously (thus reporting crashes) even when they actually stay before the intersection.

The given accuracy bounds are time-varying and determined by the positions of other vehicles and conflict areas. For example, in embodiments of FIGS. 3A-3E, the given accuracy bounds are determined by the relative position of the lead vehicle 302 from the host vehicle 301. In embodiments of FIGS. 4A-4D, the given accuracy bounds are determined by the distance of vehicles from the intersection. One way to determine the accuracy bounds at each planning time step is to find a set for each vehicle such that all the points in the set are not inside the set in which conflicts occur. Such a set for each vehicle can be represented by a polytope or an ellipse as in FIGS. 3B-3E and 4B-4D. The set in which conflicts occur is, for example, the set in which the relative distance between the vehicle 301 and 302 is smaller than a minimum safety distance $d_{min}$ or the set in which the positions of any two vehicles are inside the intersection simultaneously.

In various embodiments of the present disclosure, the problem of estimating $\hat{x}(t)$ of the state $x(t)$ of vehicles is considered. The state evolves according to the following linear system $$x(t+1)=Ax(t)+Bu(t)+w(t)$$

$$y_i(t)=C_ix(t)+v_i(t), i=1,\ldots,M$$

using a subset of the M sensor measurements, where $y_i(t)$ is the measurement of i-th sensor, $v_i(t)$ is the noise on the i-th sensor, and w(t) is the process noise. The process noise w(t) and sensor noise $v_i(t)$ are independent identically distributed, zero-mean Gaussian variables with covariances $E(w(t)w(t)^T)=W$ and $E(v_i(t)v_i(t)^T)=V_i$.

Each measurement $y_i=C_ix+v_i$ has an associated cost $\ell_i$ that represents the costs of transmitting and processing data. The communication cost of internal sensors is zero because the measurements of internal sensors are received through dedicated, e.g., not shared links, such as wired communication links. The measurements of external sensors are received through wireless communication links, and thus, the communication costs associated with external sensors are high. Examples of communication cost include a size of a packet for transmitting the measurements and the delay in transmitting the measurements. The cost would be large for a high resolution image from a camera located far from the system.

Figure 5:
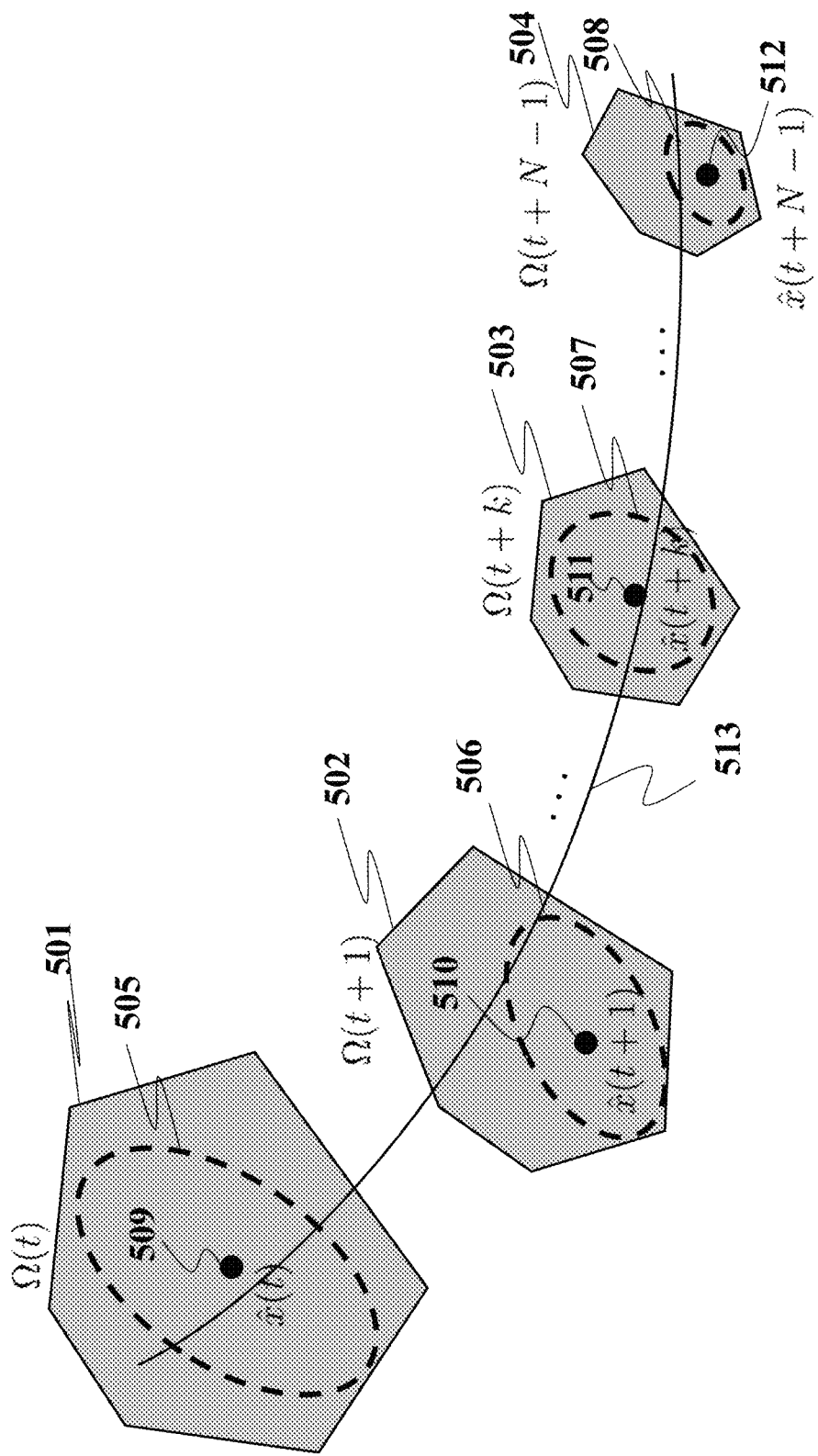
FIG. 5 shows a schematic of the accuracy bounds of the state estimate over different future time steps according to one embodiment.

FIG. 5 shows a schematic of the accuracy bounds of the state estimate over different future time steps according to one embodiment. At time t, a controller, such as the controller 102 of FIG. 1A, generates the motion of vehicles over future time steps 0, 1, . . . , N−1, considering the current state estimate 509, $\hat{x}(t)$, as the initial state. The solid line 513 represents the predicted motion of the vehicles. The estimation of the state of the vehicles should be within some bounds 501, 502, 503, and 504 over the different time steps. At each time step k, the estimation error $e(t+k)=x(t+k)-\hat{x}(t+k)$ must satisfy the error bounds $e(t+k)\in\Omega(t+k)$, where $x(t+k)$ is the actual state at time t+k and $\hat{x}(t+k)$ is the state estimate 511 at future time t+k. It is possible to satisfy this constraint by using the measurements of internal sensors and the measurements of all available external sensors. However, it is objective of some embodiments to reduce the usage of external sensors when possible.

To that end, a receding horizon state estimator 100 plans which external sensor measurements are requested at different time steps. This is advantageous because future estimation errors e(t+k) depend on the current estimation error e(t). At time t, a receding horizon estimator solves an optimization problem that computes the state estimates $\hat{x}(t)$, $\hat{x}(t+1)$, ..., $\hat{x}(t+N-1)$ over a finite horizon of time steps 0,1, ..., N-1. Only the first, or first few, estimate $\hat{x}(t+1)$ is used to generate a new sequence of inputs. At time t+1, a receding horizon estimator solves the optimization problem that computes the state estimates $\hat{x}(t+1)$, $\hat{x}(t+2)$, ..., $\hat{x}(t+N)$ over a horizon of length N starting from the current time t+1.

A conceptual receding horizon sensor selection optimization problem is given as follows, at current time step t.

$$\min \Sigma_{k=0}^{N-1} \Sigma_{i=1}^{M} \ell_i \mu_{i,t+k}$$

$$s.t. e_{t+k|t} \in \Omega(t+k)$$

where the binary variables $\mu_i, t+k \in \{0,1\}$ indicate whether the measurement of the i-th sensor will be requested at time t+k, and $e_{t+k|t}$ denotes future estimation errors at time t+k predicted at the current time step t. The cost function is the total cost, including the costs of transmitting and processing data, over the control steps 0, 1, ..., N-1. The constraints ensure that the estimation error $e_{t+k|t}$ satisfies the future bounds $e_{t+k|t} \in \Omega(t+k)$. Notice that planning ahead is required to ensure that enough measurements are gathered to satisfy possibly more restrictive future bounds $\Omega(t+k) \subset \Omega(t)$, as illustrated by the bounds 502 and 503 of FIG. 5. The implementation of the receding horizon estimator is only conceptual since how the sensor data are used to bound the estimation error $e_{t+k|t}$ is omitted. Some embodiments describe one particular method.

In one embodiment, the constraints on the accuracy of the state estimate are transformed to account for unbounded estimation errors. The Kalman filter, one of the most common methods for state estimation, produces the Gaussian estimation errors which are inherently unbounded. Thus, the hard constraints $e(t) \in \Omega(t)$ can be replaced by chance constraints $$P(e(t) \in \Omega(t)) \geq p, \tag{1}$$

Such a replacement ensures that the constraints $e(t) \in \Omega(t)$ are satisfied with at least probability p.

For the Gaussian estimation errors produced by the Kalman filter, the chance constraints $P(e(t) \in \Omega(t)) \geq p$ are guaranteed by the set-inclusion constraints $$\varepsilon(t:=\{e: e^T P(t)^{-1} e \leq \alpha(p)\} \subseteq \Omega(t), \tag{2}$$

Here, $P(t)=E(e(t)e(t)^T)$ is the covariance of the estimation error e(t), and $\alpha(p)$ is obtained using the $X^2$ distribution with n-degrees of freedom, which is the distribution of $$\sum_{i=1}^{n} Z_i^2$$

where $Z_1, \ldots, Z_n$ are independent Gaussian random variables. For instance, if n=2, $\alpha(0.9)$=4.605, $\alpha(0.95)$=5.991, and $\alpha(0.99)$=9.210. The estimation errors produced by the Kalman filter have zero mean E(e(t))=0.

FIG. 5 shows the set-inclusion constraints (2). The ellipses 505, 506, 507, and 508 that contain the unbounded estimation errors with probability of at least p are contained inside the given accuracy bounds 501, 502, 503, and 504.

One embodiment checks the satisfaction of the set-inclusion constraints (2) by providing equivalent constraints. If the error sets are polytopes $$\Omega(t)=\{e: h_j^T e \leq k_j \forall j \in \mathcal{J}(t)\},$$

then the set-inclusion constraints (2) are equivalent to the linear matrix inequalities (LMI)

$$P(t)^{-1} \succeq \alpha(p) \frac{h_j h_j^T}{k_j^2}, \forall j \in \mathcal{J}(t). \tag{3}$$

It is computationally efficient and easy to check the satisfaction of the LMI (3) because it is equivalent, from the Schur Complement, to the following scalar nonnegative constraints $$\begin{bmatrix} P_{t+1|t+1}^{-1} & h_j \\ h_j^T & k_j^2/\alpha(p) \end{bmatrix} \succeq 0, \tag{4}$$

$$\forall j \in \mathcal{J}(t+1) \Leftrightarrow \frac{k_j^2}{\alpha(p)} - h_j^T (P_{t+1|t+1}^{-1})^{-1} h_j \geq 0,$$

$$\forall j \in \mathcal{J}(t+1),$$

where $P_{t+1|t+1}^{-1} \succ 0$ is positive definite and $k_j^2/\alpha(p)>0$ is positive. The constraint (4) is scalar and the satisfaction of the set-inclusion constraints (2) can be determined just by checking if the scalar value in (4) is positive for all indexes of the polytopic error bounds $\Omega(t+1)$.

One embodiment formulates the receding horizon sensor selection optimization problem using the Kalman filter theory. Given the inverse covariance $P_{t|t}^{-1}$ at the current time t, $$\min \sum_{k=0}^{N-1} \sum_{i=1}^{M} \ell_i \mu_{i,t+k} \tag{5}$$

$$s.t. \quad P_{t+k+1|t+k+1}^{-1} = P_{t+k+1|t+k}^{-1} + \sum_{i=1}^{M} \mu_{i,t+k} C_i^T V_i^{-1} C_i,$$

$$P_{t+k+1|t+k+1}^{-1} = f(P_{t+k|t+k}^{-1}),$$

$$P_{t+k+1|t+k+1}^{-1} \succeq \alpha(p) \frac{h_j h_j^T}{k_j^2}, \forall j \in \mathcal{J}(t+k+1).$$

where $f(Q)=A^{-T}QA^{-1}-A^{-T}QA^{-1}(W^{-1}+A^{-T}QA^{-1})^{-1}A^{-T}QA^{-1}$ is the open-loop dynamics of the inverse state covariance $P_{t+k|t+k}^{-1}$ without measurement. If $\mu_i, t+k=1$ for all i, the constraints are the same as the Kalman covariance update. Solutions to the optimization problem (5) minimize the total communication costs while satisfying the chance constraints (1) on the accuracy of the state estimate for each step of a planning horizon.

The constraints $P_{t+k+1|t+k+1}^{-1}=P_{t+k+1|t+k}^{-1}+\sum_{i=1}^{M} \mu_{i,t+k} C_i^T V_i^{-1} C_i$ and $P_{t+k+1|t+k}^{-1}=f(P_{t+k|t+k}^{-1})$ and in the receding horizon sensor selection optimization problem (5) show the dependency of the covariance matrix $P_{t+k+1|t+k+1}^{-1}$ at time step t+k+1 on the covariance matrix $P_{t+k|t+k}^{-1}$ at the previous time step. The covariance matrix $P_{t+k|t+k}^{-1}$ represents the accuracy of the state estimate at time step t+k and thus the set-inclusion constraints (2). Thus, the two constraints $P_{t+k+1|t+k+1}^{-1} = P_{t+k+1|t+k}^{-1} + \sum_{i=1}^{M} \mu_{i,t+k} C_i^T V_i^{-1} C_i$ and $P_{t+k+1|t+k}^{-1} = f(P_{t+k|t+k}^{-1})$ indicate the dependency of the state estimate accuracies between two subsequent time steps.

One way to solve the optimization problem (5) is to consider all possible combinations of external sensors over the planning horizon. All possible combinations form a tree that has M branches at planning step 1, $M^2$ branches at planning step 2, and $M^N$ branches at planning step N. The optimal solution can be found by evaluating each branch of the tree at each planning step and choosing the one corresponding to the minimum cost while satisfying the constraints. Another way to solve the problem is to use an available mixed-integer programming solver. Examples of mixed-inter programming solvers are CPLEX, Gurobi, and Yalmip.

Some embodiments present our approximate approach to solving the receding horizon sensor selection problem (5) using lazy and greedy heuristics. An approximate approach is adopted because finding an optimal solution of the receding horizon sensor selection problem (5) is computationally demanding due to non-convexity and the presence of binary decision variables. First, the problem (5) is divided into N subproblems. Instead of solving the problem (5) over the horizon N at once, only one subproblem over one-time step is focused. Each subproblem refers to $$\min \sum_{i=1}^{M} \ell_i \mu_{i,t} \quad (6)$$

$$\text{s.t.} \quad P_{t+1|t+1}^{-1} = P_{t+1|t}^{-1} + \sum_{i=1}^{M} \mu_{i,t} C_i^T V_i^{-1} C_i,$$

$$P_{t+1|t}^{-1} = f(P_{t|t}^{-1}),$$

$$P_{t+1|t+1}^{-1} \succeq \alpha(p) \frac{h_j h_j^T}{k_j^2}, \forall j \in \mathcal{J}(t+1).$$

where $\mathcal{J}(t+1)$ indexes the constraints of the polytopic error bounds $\Omega(t+1)$. That is, to satisfy the error bound $e(t+k) \in \Omega(t+k)$, we can lazily wait until time t+k before selecting sensors. We assume that the measurements of internal and external sensors are enough to satisfy the constraints of the problem (5) at every stage of the problem (5). In other words, $\mu_{i,t} = 1$ for all i is always a feasible solution of the subproblem (6). This assumption ensures the feasibility of all subsequent subproblems, thereby making the solutions to the subproblems (6) a feasible solution to the problem (5).

In some embodiments, different greedy heuristics for solving the single-stage sensor selection problem (6) are presented. For greedy heuristics, a utility of each external sensor is defined as a function of the ability in improving the accuracy of the state estimate and communication cost of each external sensor. For example, an external sensor with smaller communication cost but low ability in improving the accuracy of state estimation can be less useful for reducing the total communication cost while satisfying the constraint on the state estimate than an external sensor with greater communication cost but higher ability to improve the accuracy.

The ability of an external sensor is quantified as a slack on the j-th constraint $$s_{j,t}(Q) := \frac{k_j^2}{\alpha(p)} - h_j^T Q^{-1} h_j. \quad (7)$$

This represents the ability of an external sensor in improving the accuracy of the state estimate because from (4), if $s_{j,t}(Q) \geq 0$, the j-th constraint is satisfied, that is, $\{e : e^T Q e \leq \alpha(p)\} \subseteq \{e : h_j^T e \leq k_j\}$. A reward metric $r_{i,t}(Q)$ on the i-th sensor is defined as the maximum difference between the nominal constraint slack $s_{j,t}(Q)$ and the slack after the removal of the i-th sensor $s_{j,t}(Q - C_i^T V_i^{-1} C_i$, that is, $$r_{i,t}(Q) := \max_{j \in \mathcal{J}(t+1)} h_j^T (Q - C_i^T V_i^{-1} C_i)^{-1} h_j - h_j^T Q^{-1} h_j. \quad (8)$$

The reward is nonnegative because the slack is reduced as measurements are taken away. The reward $r_{i,t}(Q)$ measures how the removal of the i-th external sensor's measurement affects the violation of the error constraints $\Omega(t+1)$. The smallest $r_{i,t}(Q)$ means that removing the external sensor has least effect on slacks.

In one embodiment, a utility of each external sensor is stored in a memory 222 of FIG. 2A. The utility of the i-th external sensor is defined as the minimum reward-relative-to-cost ratio, $$\frac{r_{i,t}(Q)}{\ell_i^2}.$$

In this exemplar implementation, $\ell_i^2$ rather than $\ell_i$ is considered to balance the weights of the contribution to the constraints and the associated cost because the slack $s_{j,t}(Q)$ is defined in terms of the square of $k_j$, which defines half-spaces of the constraints (3). However, alternative implementations use different distance metrics.

In one embodiment, the sensor selector, upon receiving the constraint on state accuracy, is configured to iteratively remove external sensors from the subset of external sensors in a reverse order of their utility until the accuracy of the state estimate using the measurements of the subset of external sensors satisfies the constraint on state estimate accuracy. If $r_{j,t}(Q) > r_{i,t}(Q) > 0$, removing the i-th external sensor has less effect on the constraint slack than the j-th external sensor. If the two external sensors have the same communication cost, then removing the i-th external sensor is preferable because it is then more likely that an additional sensor can be removed in the next iteration. In alternative embodiment, the sensor selector, upon receiving the constraint on state accuracy, is configured to iteratively add external sensors in the subset of external sensors in an order of their utility until the accuracy of the state estimate the measurements of the subset of external sensors satisfies the constraint on state estimate accuracy. For the alternative embodiment, the definition of utility is slightly changed.

Figure 6:
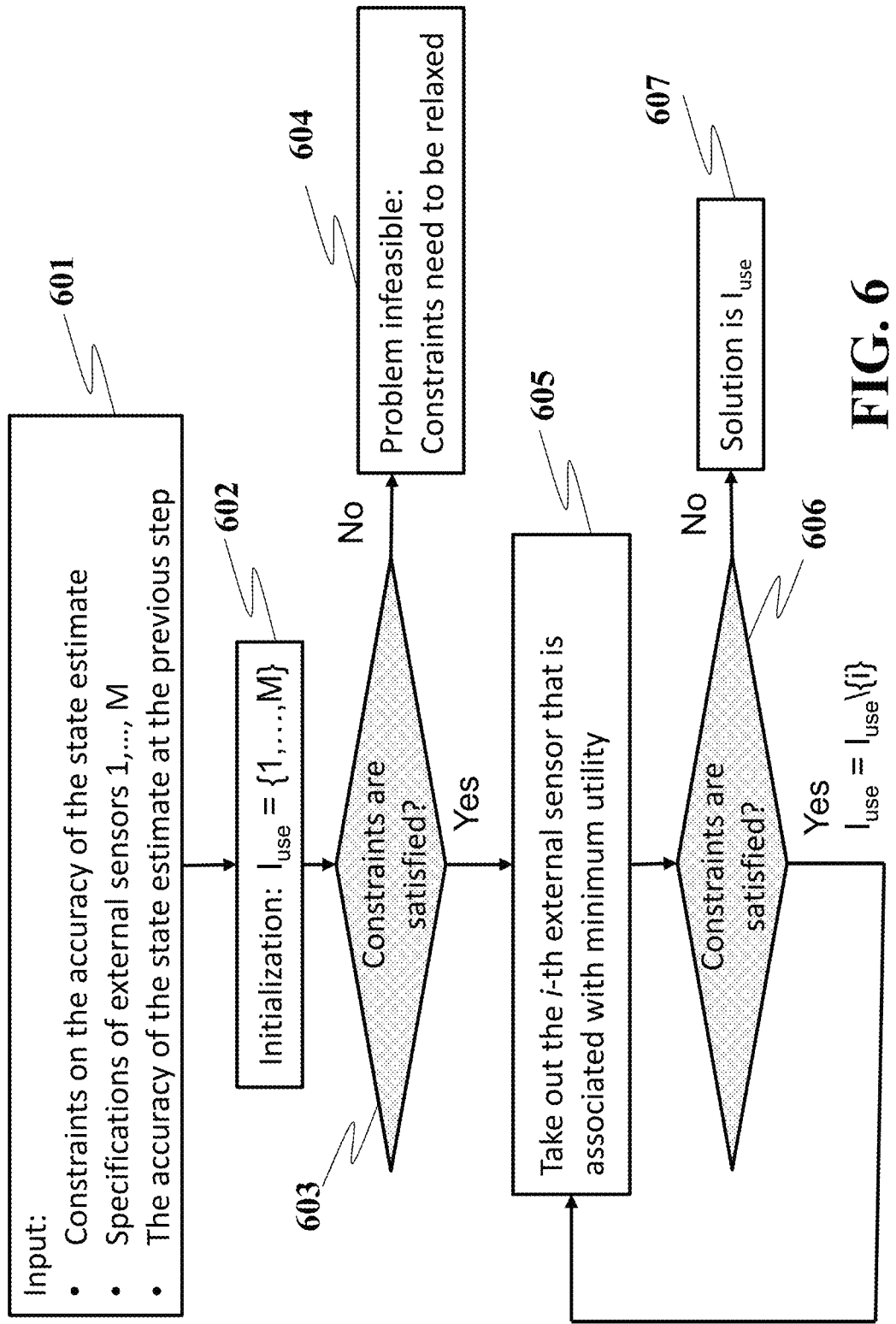
FIG. 6 shows a block diagram of a greedy subtraction heuristic according to some embodiments.

FIG. 6 shows a block diagram of a greedy subtraction heuristic according to some embodiments. In the heuristic, an external sensor is subtracted from the set $I_{used}$ at each iteration, where $I_{used}$ is the set of external sensors that are to be requested and communicated with. The heuristic takes the inputs 601 of the constraints on the accuracy of the state estimate, the specifications of external sensors 1, 2, . . . , M, and the accuracy of the state estimate at the previous step. For example, the specifications regard what external sensors are measuring, which relates to $C_i$, and the noise characteristic, which relates to $V_i$. The accuracy of the state estimate at the previous step is represented by the convariant matrix $P_{t|t}$. The initialization process 602 considers using the measurements of all available external sensors $I_{used}=\{1, \ldots, M\}$ and have the corresponding inverse of a posterior covariance matric $$Q = f(P_{t|t}^{-1}) + \sum_{i=1}^{M} C_i^T V_i^{-1} C_i.$$

The heuristic reports in 604 that the optimization problem (6) is infeasible if the constraints are not satisfied even with the measurements of internal sensors and all external sensors. If using all measurements allows the satisfaction of the constraints, the sensor selection process 605 finds the external sensor i that is associated with the minimum utility. If removing the external sensor i does not violate the constraints, the external sensor is removed from the set $I_{used}$ and corresponding information is removed from Q; that is, let $I_{used}=I_{used}\backslash i$ and $Q=Q-C_i^T V_i^{-1} C_i$. The subtraction is performed as long as the constraints are satisfied. The algorithm terminates in 607 when there is no external sensor that can be removed from $I_{used}$ without violating constraints.

Checking the satisfaction of the constraints in 603 and 606 of FIG. 6 is performed by checking the sign of the slack $$\min_j s_{j,t}(Q - C_i^T V_i^{-1} C_i).$$

This slack indicates the satisfaction of the estimation error constraints (2) after the removal of the i-th external sensor. For instance, if it is negative, then removing the i-th external sensor causes the state estimator error to violate the bounds $\Omega(t+1)$. For sensor with a positive slack, the sensor can be removed without violating constraints. In one embodiment, other possible heuristics are presented.

Figure 7:
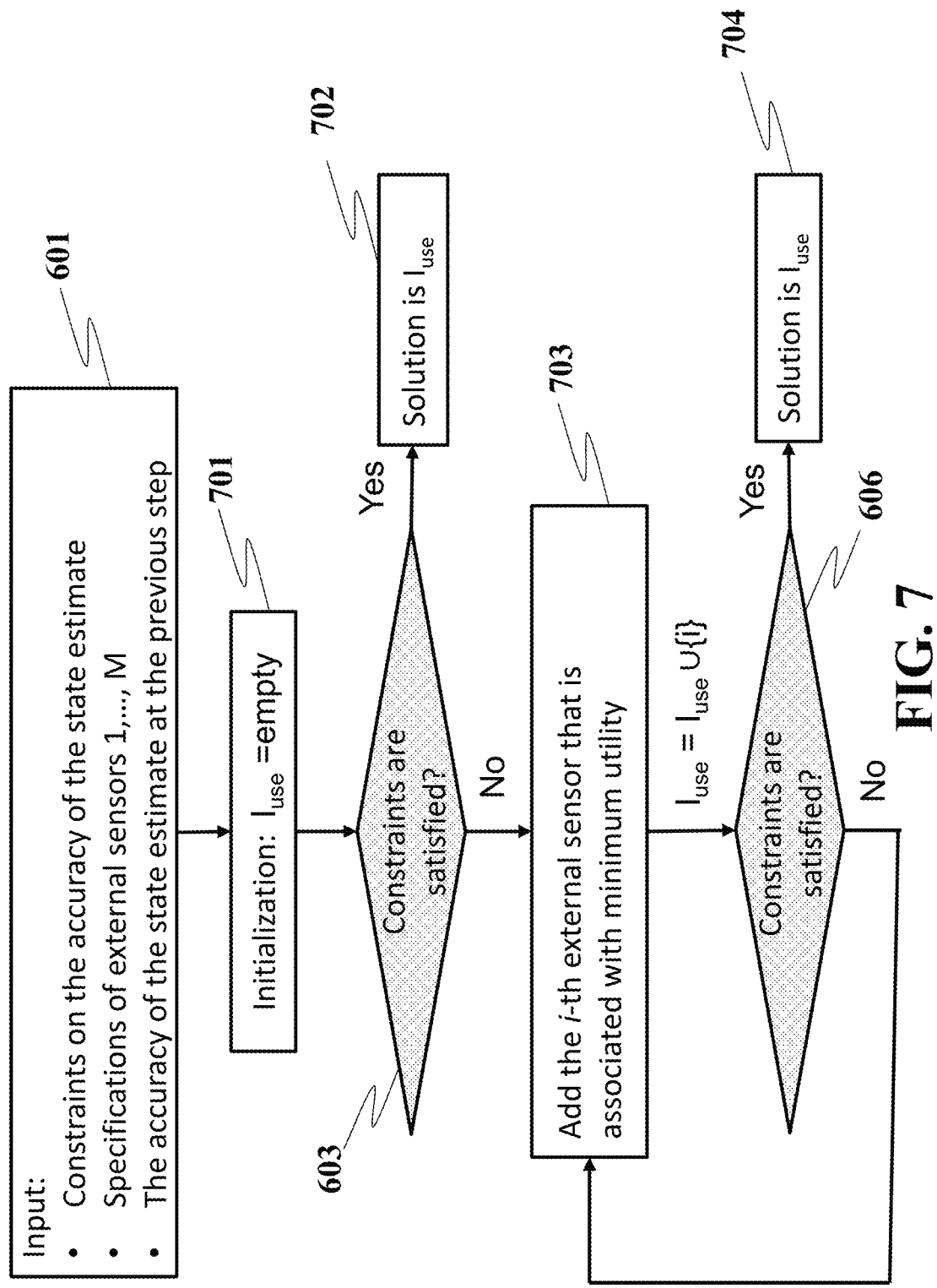
FIG. 7 shows a block diagram of a greedy addition heuristic that adds external sensors that correspond to the maximum utility until the constraints on the accuracy of the state estimate are satisfied according to some embodiments.

FIG. 7 shows a block diagram of a greedy addition heuristic that adds external sensors that correspond to the maximum utility until the constraints on the accuracy of the state estimate are satisfied according to some embodiments. In the greedy addition heuristic, the ability in improving the accuracy of the state estimate by adding the i-th external sensor is quantified as the minimum difference between the slack after adding the i-th external sensor $$s_{j,t}(Q+C_i^T V_i^{-1} C_i)$$

and the nominal slack $s_{j,t}(Q)$. That is, $$r'_{i,t}(Q) := \min_{j \in \mathcal{J}(t+1)} h_j^T Q^{-1} h_j - h_j^T (Q + C_i^T V_i^{-1} C_i)^{-1} h_j.$$

Because the slack increases as external sensors are added, the ability in improving the accuracy of the state estimate is always nonnegative.

The greedy addition heuristic takes the same input 601 as the greedy subtraction heuristic of FIG. 6. The algorithm starts with $I_{use}=\emptyset$ and $Q=f(P_{t|t}^{-1})$ in the initialization process 701. In the heuristic iterations, the set of external sensors that are to be requested $I_{use}$ is increased to $I_{use} \cup i$, and the inverse of the covariance Q is increased to $Q+C_i^T V_i^{-1} C_i$ as more external sensors with the maximum value of $r'_{i,t}(Q)/\ell_i^2$ are added in 703. The choice of the maximum value of $r'_{i,t}(Q)/\ell_i^2$ is because it is desired to increase the slack as much as possible (to a positive value) with smallest costs by adding sensors. The iteration terminates when the constraints are satisfied in 702 and 704. Checking the satisfaction of the constraints is performed by checking whether $$\min_j s_{j,t}(Q)$$

is positive.

Figure 8:
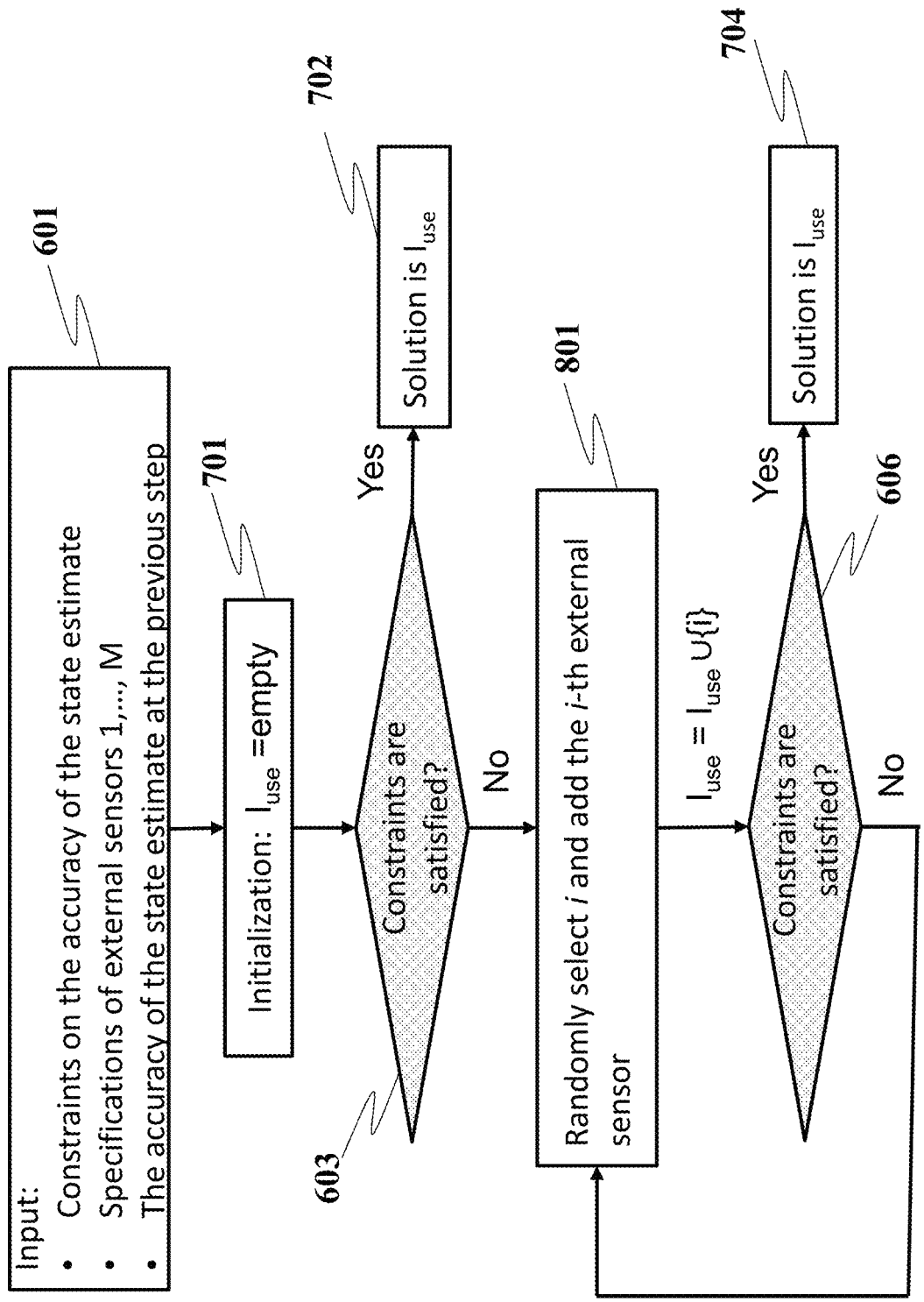
FIG. 8 shows a block diagram of a random heuristic that adds a randomly selected external sensor at a time until the constraints on the accuracy of the state estimate are satisfied according to some embodiments.

FIG. 8 shows a block diagram of a random heuristic that adds a randomly selected external sensor at a time until the constraints on the accuracy of the state estimate are satisfied according to some embodiments. The difference in this heuristic is that in the iteration 801, a randomly selected external sensor is added to the set $I_{use}$ to check if the constraints are satisfied by checking whether $$\min_j s_{j,t}(Q)$$

is positive in 603 and 606.

Figure 9:
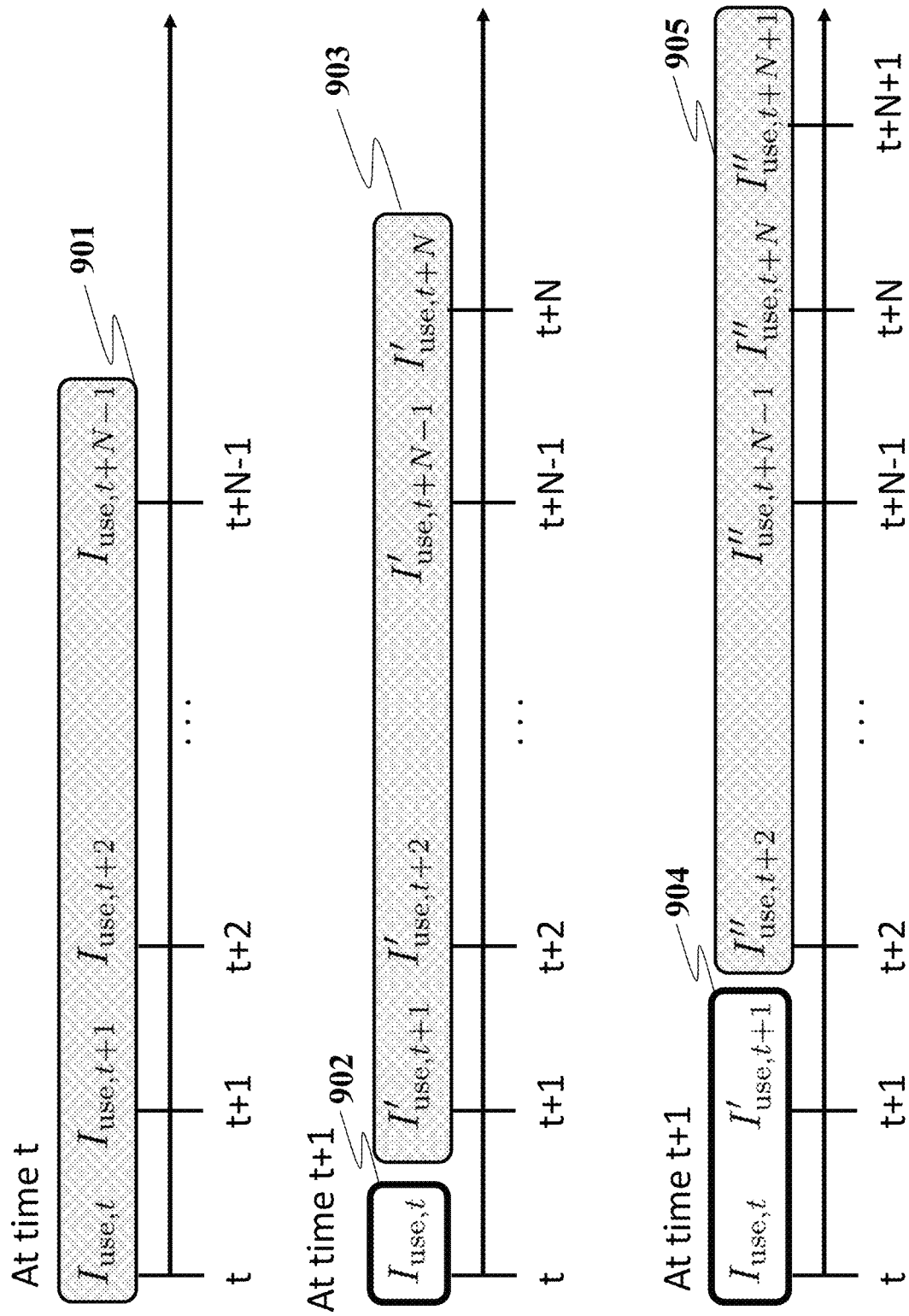
FIG. 9 shows a block diagram of the implementation of the heuristics in a receding horizon fashion according to some embodiments.

FIG. 9 shows a block diagram of the implementation of the heuristics in a receding horizon fashion according to some embodiments. At time step t, the heuristic is used to solve the N subproblems and obtain the solutions in 901 of $I_{use,t}, I_{use,t+1}, I_{use,t+2},$ and $I_{use,t+N-1}$, where $I_{use,t+k}$ is the set of external sensors that are to be requested at future time step t+k. At time step t, the receding horizon state estimator uses the measurements of internal sensors and the measurements of the subset of external sensors $I_{use,t}$ in 902 to estimate the state. At the next time step t+1, the state estimator again uses the heuristic to solve the k subsequent N subproblems and obtain the solutions in 903 of $I'_{use,t+1+k}$ for k=0, 1, ..., N−1. The state estimator uses the measurements of the subset of external sensors $I'_{use,t+1}$ in 904 along with the measurements of internal sensors to estimate the state, and at the time step t+1, it again solves the subsequent N subproblems. The implemented subsets 904 of the external sensors are the solutions to the first subproblem at each time step.

In one embodiment of the invention, backstepping is used to account for the dependency of the state estimate accuracy at a planning time step on the state estimate accuracy at the previous step. The dependency implies that when the solutions 901 in FIG. 9 of the N subproblems over the planning horizon are $I_{use,t}, I_{use,t+1}, I_{use,t+2},$ and $I_{use,t+N-1}$, the change of the solution at time t+1, for example to $I'_{use,t+1}$ instead of $I_{use,t+1}$, affects the solution $I_{use,t+2}$ at the next time step. $I_{use,t+2}$ may not be a solution that satisfies the constraints of the subproblem at time step t+2 anymore due to the change of the solution at time step t+1.

Figure 10:
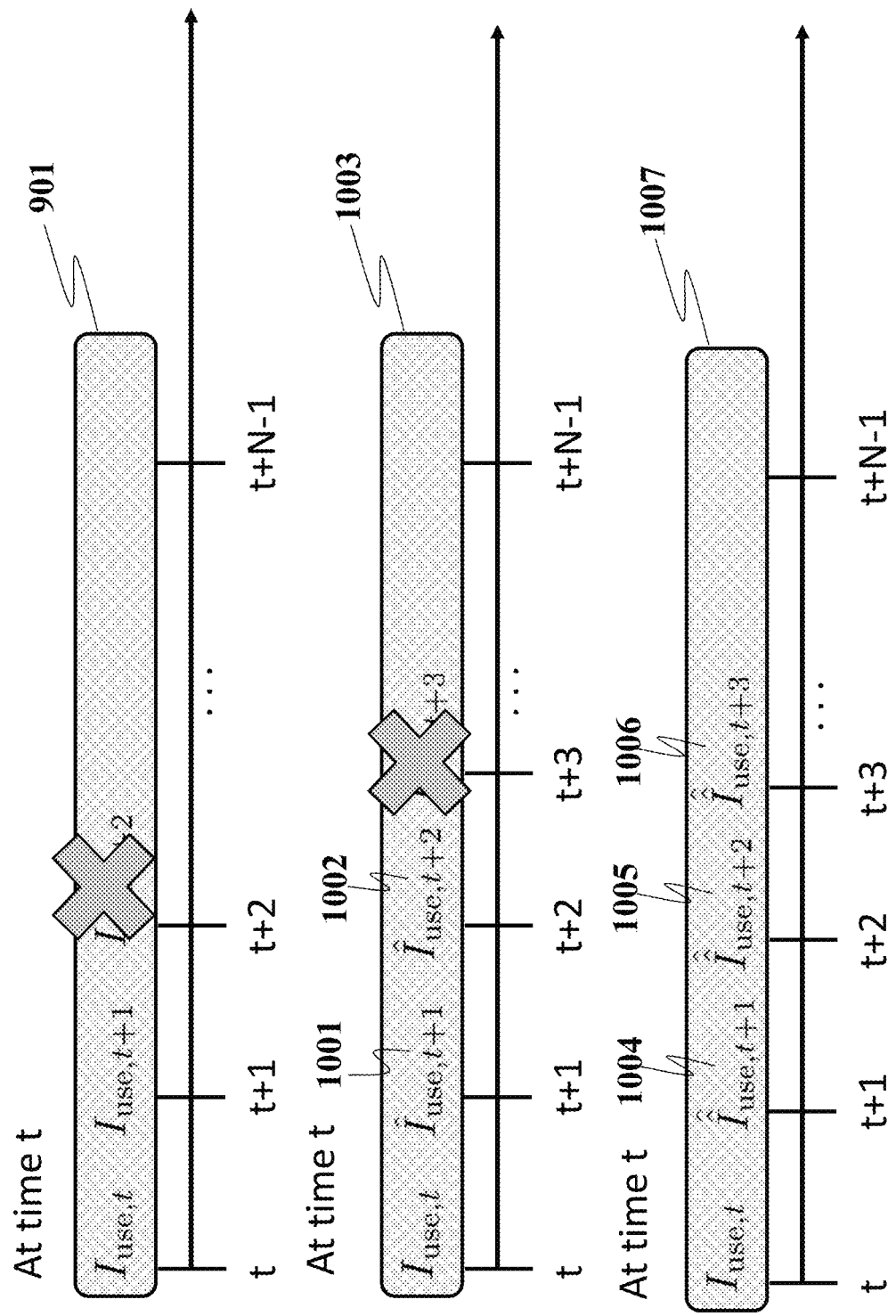
FIG. 10 shows an example of backstepping used by some embodiments.

FIG. 10 shows an example of backstepping used by some embodiments wherein there is no solution in 901 that satisfies the constraints of the subproblem at time t+2. Backstepping is used to resolve this issue. That is, the solution $I_{use,t+1}$, which is the set of external sensors determined at the previous time t+1, should be changed to use additional sensors to obtain more accurate state estimate at time t+1 to enable the existence of a solution that satisfies the constraints of the subsequent subproblem. Because $I_{use,t+1}$ in 901 causes the infeasibility of the subsequent subproblem at time t+2, a new solution $\hat{I}_{use,t+1}$ of the subproblem at time t+1 in 1001 is obtained so that a feasible solution $\hat{I}_{use,t+2}$ of the subproblem at time t_2 in 1002 exists. One example of obtaining a new solution $\hat{I}_{use,t+1}$ is by adding the last external sensor among the sensors that have been subtracted in the greedy subtraction heuristic algorithm. If with $\hat{I}_{use,t+1}$ and $\hat{I}_{use,t+2}$, there is no solution that satisfies the constraints of the subproblem at t+3 in 1003, backstepping reconsiders the previous subproblem at t+2 to see if the solution of t+2 can be changed to enable the existence of a feasible solution of the subproblem at t+3. If not possible, backstepping considers the subproblem at t+1 to see if feasible solutions at time steps t+2 and t+3 exist. By doing this, the solutions of the N subproblems 1007 guarantee the satisfaction of the constraints of the receding horizon sensor selection problem (5) over the planning horizon.

Figure 11:
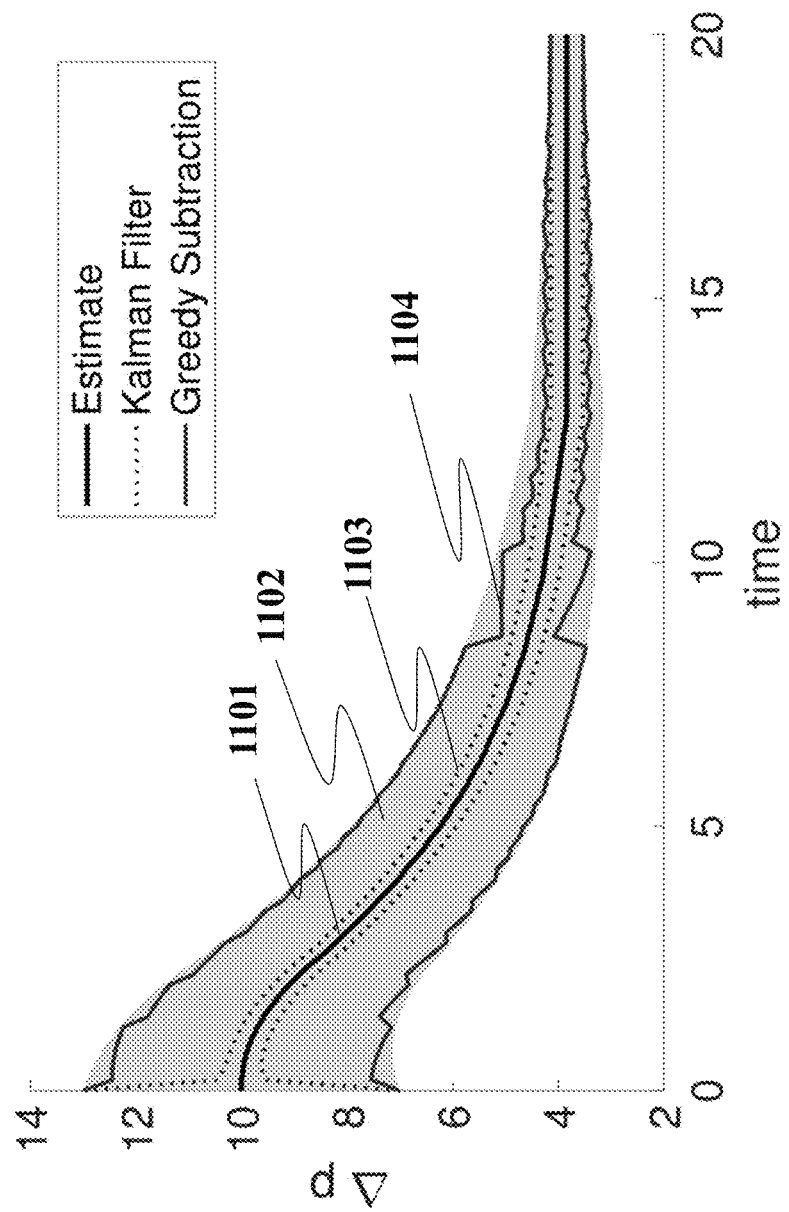
FIG. 11 shows the simulation result for the rear-end collision avoidance scenario in FIG. 3A.

FIG. 11 shows the simulation result for the rear-end collision avoidance scenario in FIG. 3A where the control unit embedded in the vehicle 301 maintains the minimum safety distance, $d_{min}=3$, from the lead vehicle 302. FIG. 11 shows the estimate of position difference $\Delta p$ between the vehicles 301 and 302 and resulting accuracy bounds over time. The estimate of $\Delta p$ is represented by the black solid line 1101, and the estimation error bounds $\Omega(t)$ are represented by the gray region 1102 surrounding the line 1101. Given estimation error bounds $\Omega(t)$, the vehicle 301 is controlled that the distance from the lead vehicle 302, denoted by $\Delta p$, is no smaller than $d_{min}$ for all possible errors inside the error bounds. Using the measurements of internal sensors and the measurements of all external sensors embedded in the lead vehicle 302 and roadside unit 303, the Kalman filter returns the bound 1103 around the estimate 1101. The bound 1103 means that the actual value of $\Delta p$ is within the bounds 1103 with probability of p=0.95. The greedy subtraction heuristic yields, using the measurements of internal sensors and the measurements of a subset of external sensors, the bound 1104 around the estimate 1101. Again, the bound 1104 means that the actual value of $\Delta p$ is within the bound with probability of 0.95. Note that the bounds 1104 of the greedy subtraction heuristic is a superset of the bounds 1103 of the Kalman filter but are inside the desired bounds 1102, which means that the bounds 1104 of the greedy subtraction heuristic satisfies the set-inclusion constraints (2).

Figure 12:
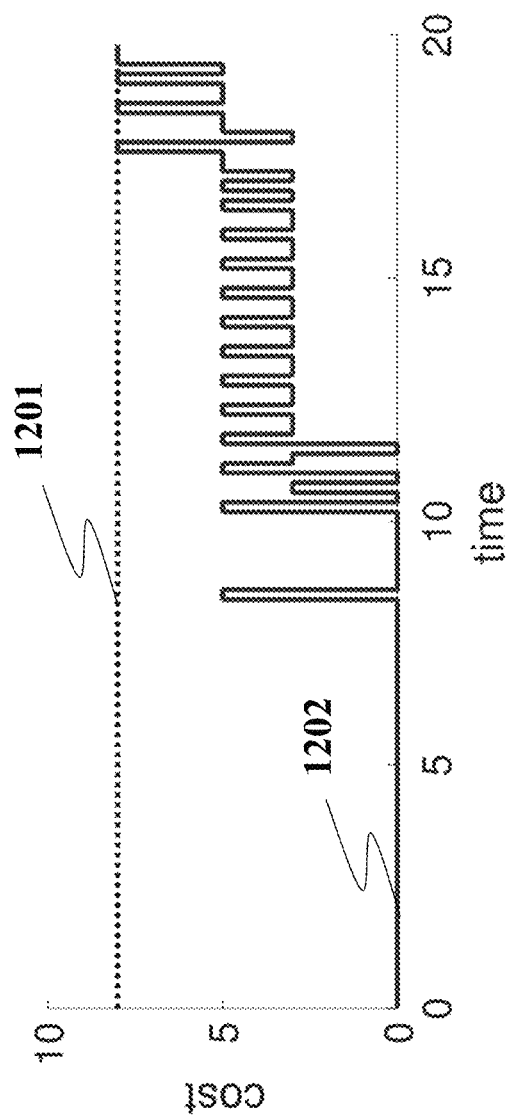
FIG. 12 shows the total communication at each time step for the same simulation result as in FIG. 11.

FIG. 12 shows the total communication at each time step for the same simulation result as in FIG. 11. Using the measurements of all external sensors gives the maximum total cost 1201. Because the greedy subtraction heuristic uses different subsets of external sensors at different time steps, the total communication costs 1202 at each time step is different and always no greater than the cost 1201. As the constraints 1102 on the accuracy of the state estimation gets tighter as the vehicle 301 progresses, a larger number of external sensors are required to obtain the state estimate that satisfies the constraints. Therefore, the total communication cost 1202 of the greedy subtraction heuristic tends to increase as the vehicle 301 gets close to the lead vehicle 302.

Figure 13:
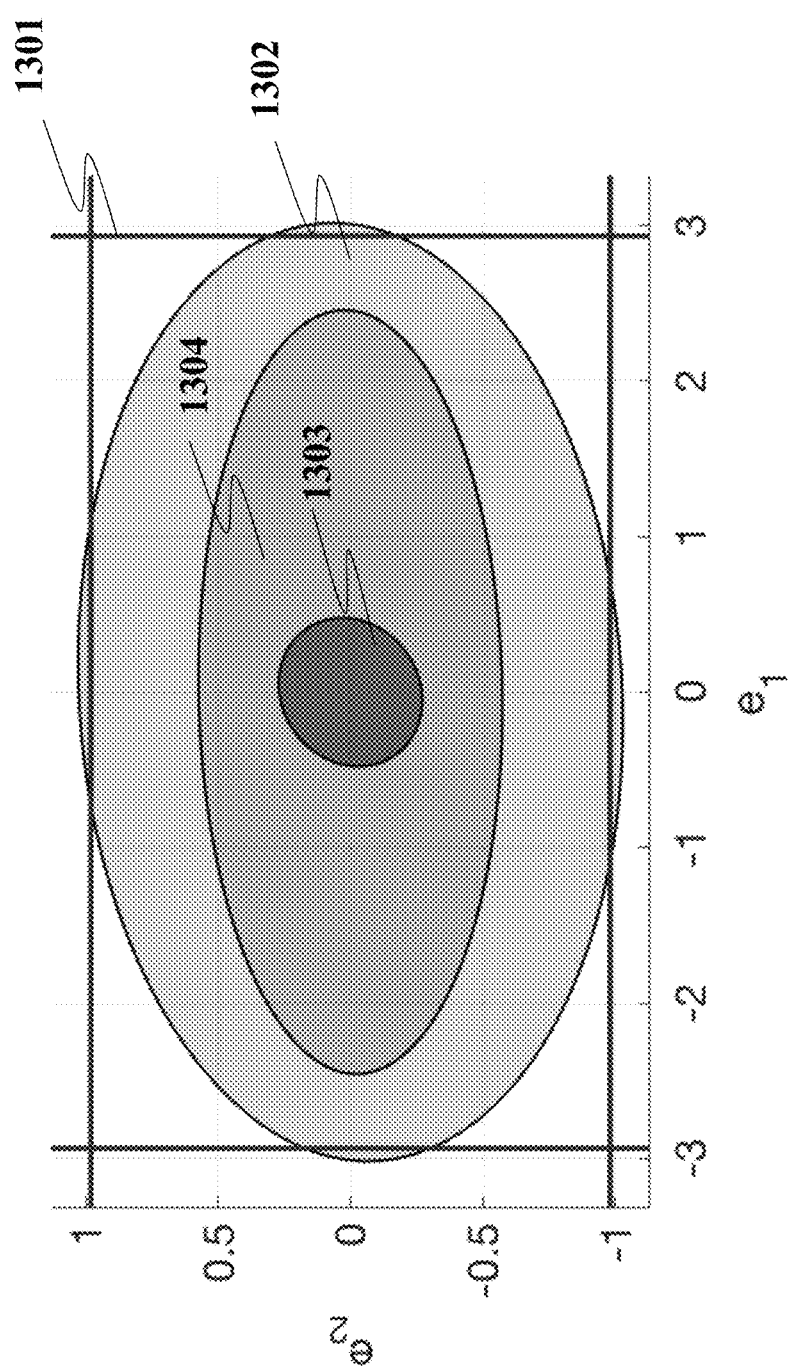
FIG. 13 shows the graphical representation of the set-inclusion constraints for the same simulation result as in FIG. 11 and FIG. 12.

FIG. 13 shows the graphical representation of the set-inclusion constraints (2) at time step 1 for the same simulation result as in FIG. 11 and FIG. 12. The given estimation error bounds $\Omega(1)$ are represented by the rectangle 1301 surrounded by the four red lines. Without using any measurement, the ellipse $\{e=(e_1, e_2)|e^T P_{1|0}^{-1} e \leq \alpha(0.95)\}$ based on the prior covariance matric $P_{1|0}$ is represented by the gray large ellipse 1302. The ellipse 1302 contains the errors between the estimate of $\Delta p$ and the actual value with probability of 0.95 before obtaining any measurement. The ellipse 1302 without using any measurement violates the set-inclusion constraints (2) because the ellipse 1302 is not contained inside the error bounds 1301. Using the measurements of internal sensors and the measurements of all external sensors, the Kalman filter yields the smallest ellipse 1303. This means that with probability of 0.95, the errors are within the smallest ellipse 1303. The greedy subtraction heuristic yields the ellipse 1304 by selecting a subset of external sensors. The ellipse 1303 of the Kalman filter ellipse is always contained inside the ellipse 1304 of the greedy subtraction heuristic, and both ellipses 1303 and 1304 satisfy the set-inclusion constraints (2).

Figure 14:
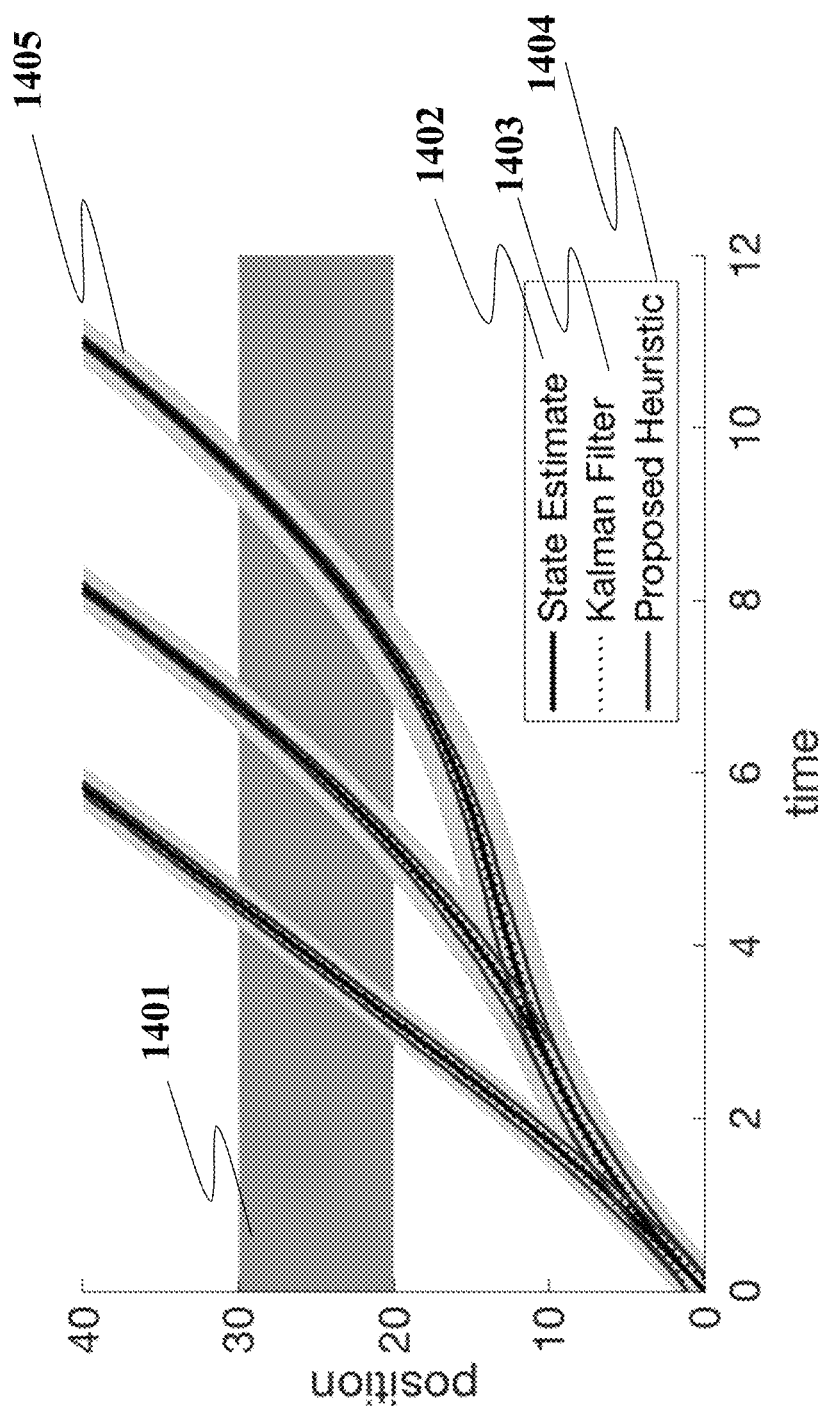
FIG. 14 shows a simulation result for the intersection collision avoidance scenario in FIG. 4A.

FIG. 14 shows a simulation result for the intersection collision avoidance scenario in FIG. 4A where the controller embedded in the roadside unit 401 controls the approaching vehicles 402, 403, and 404 to prevent them from simultaneously being inside the intersection. The position estimates of the vehicles 402, 403, and 404 are presented by the black solid lines 1402. The desired bounds of the accuracy of the state estimate are represented by the gray regions 1405. FIG. 14 shows the positions of the vehicles 402, 403, and 404 over time when they approach the intersection 1401 located between 20 and 30. Note that the vehicles are controlled so that they are not inside the intersection at the same time for all estimation errors within the desired bounds. Using the measurements of all external sensors embedded on the vehicles 402, 403, and 404, the Kalman filter yields the accuracy, represented by the blue dotted lines 1403 around the estimates, within the desired accuracy bounds 1405. The Kalman filter ensures that the actual values of the positions are within the accuracy bounds 1403 with probability of 0.95. Using the measurements of a subset of external sensors, the greedy subtraction heuristic yields the accuracy bounds, represented by the red solid lines 1304, also within the desired accuracy bounds 1405. The greedy subtraction heuristic ensures that the actual values of the positions are within the accuracy bounds 1404 with probability of 0.95. Because the accuracy bounds 1404 of the greedy subtraction heuristic is contained in the desired accuracy bounds 1405, the set-inclusion constraints (2) is satisfied while using only a subset of external sensors.

Figure 15:
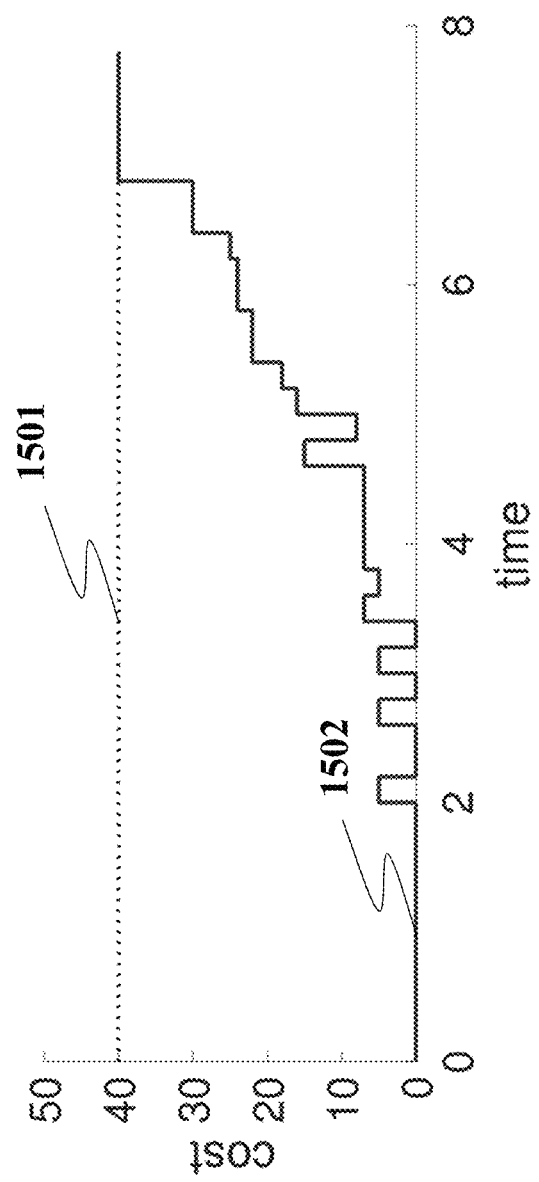
FIG. 15, FIG. 16A and FIG. 16B show the total communication cost for the same simulation result as in FIG. 13.
Figure 16A:
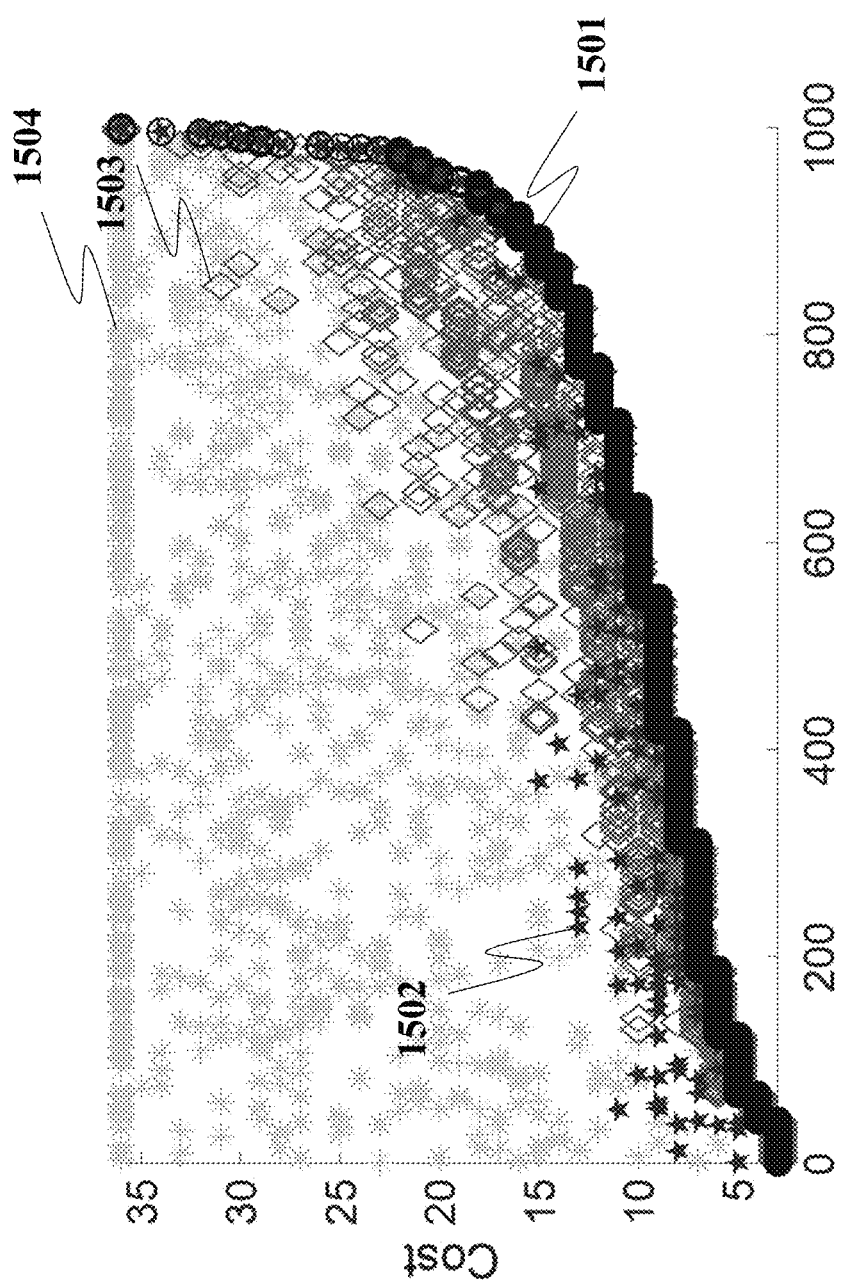
Figure 16B:
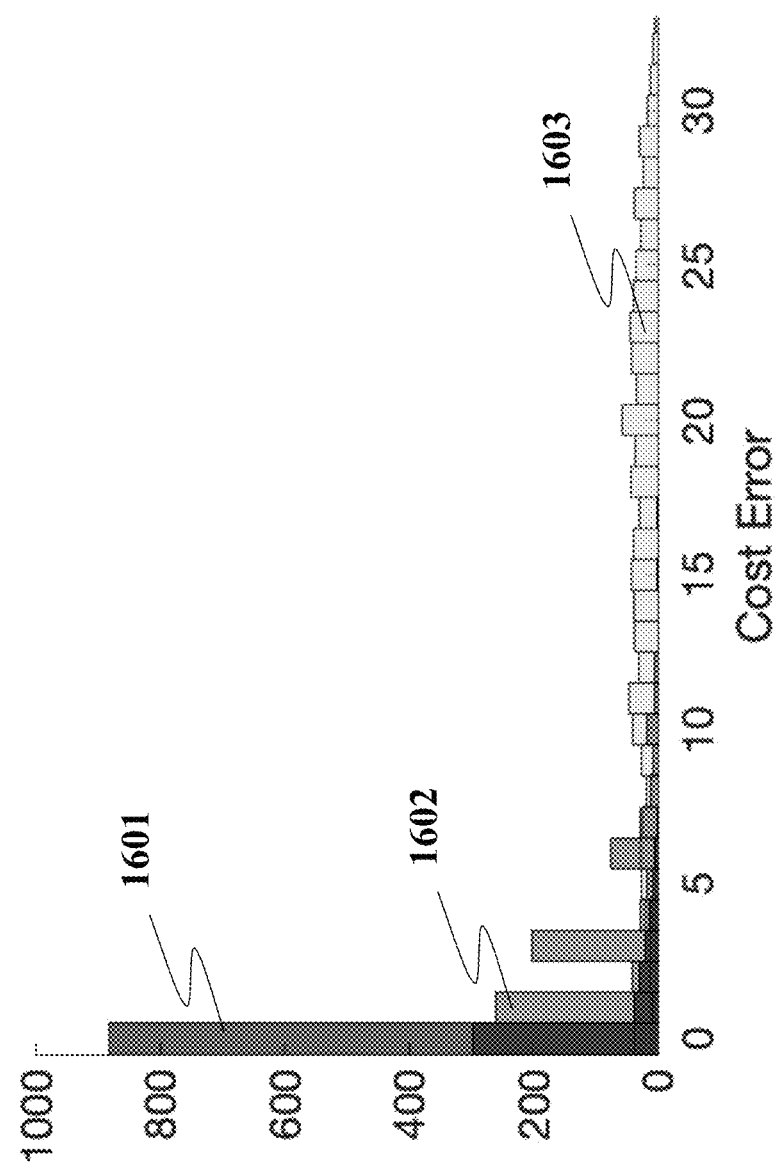

FIG. 15, FIG. 16A and FIG. 16B show the total communication cost for the same simulation result as in FIG. 13. Using the measurements of all external sensors gives the maximum total cost 1401. Because the greedy subtraction heuristic uses different subsets of external sensors at different time steps, the total communication costs 1502 at each time step is different and always no greater than the cost 1501. As the desired accuracy bounds 1405 get tighter as the vehicles 402, 403, and 404 are closer to the intersection, the measurements of a larger number of external sensors are required to obtain the state estimate that satisfies the set-inclusion constraints (2). Therefore, the total communication cost 1502 of the greedy subtraction heuristic tends to increase as the vehicles 402, 403, and 404 approach the intersection.

FIG. 15, FIG. 16A and FIG. 16B show the simulation results using a set of 1,000 randomly generated simulation cases. In each case, the noise covariance $V_i$ for $i \in \{1, 2, \ldots, 8\}$ (8 measurements) and a priori covariance matrix $P_{t+1|t}^{-1}$ are randomly generated. For each simulation case, FIG. 15 shows the optimal costs 1501 of subproblem (6), which are obtained from evaluating all possible combinations of external sensors, and the costs of the greedy subtraction 1502, greedy addition 1503, random heuristics

1504. The result shows that most cost 1502 of the greedy subtraction heuristic is close to the optimal cost 1501. FIG. 16B shows the histogram of the difference between the cost of the heuristics and the optimal cost. The difference 1601 between the cost of the greedy subtraction heuristic and the optimal cost is zero in 88.3% of the cases and has a distribution that gives the maximum difference of 7. The difference 1602 between the cost of the greedy addition heuristic and the optimal cost is zero in 29.8% of the cases and has a distribution that gives the maximum difference of 17. The difference 1603 between the cost of the random heuristic and the optimal cost is widely distributed.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. A processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

We claim:

1. A receding horizon state estimator for estimating a state of a vehicle based on a prediction horizon, wherein, during an operation, the receding horizon state estimator is connected to internal sensors for providing internal measurements over internal communication channel and connected to external sensors for providing external measurements over shared communication channel, the receding horizon state estimator comprising:

an input interface configured to accept configuration of a set of external sensors accessible for each time step of the prediction horizon and a constraint on state estimation accuracy for each time step of the prediction horizon;

a processor configured to (1) select, for each time step of the prediction horizon, a subset of a corresponding set of external sensors accessible for a corresponding time step with external measurements sufficient to estimate the state of the vehicle that satisfies the constraint on state estimation accuracy for the corresponding time step while reducing a total communication cost of acquiring the external measurements over the prediction horizon, wherein a state estimation accuracy for a time step is a function of a previous state estimation accuracy for a previous time step; (2) request the external measurements from the subset of external sensors determined for a current time step; and (3) estimate the state of the vehicle using the internal measurements of the internal sensors and the requested external measurements of the subset of external sensors determined for the current time step; and an output interface configured to output the state of the vehicle for the current time step.

2. The receding horizon state estimator of claim 1, wherein the processor is configured to solve a mixed integer optimization problem to determine the subset of external sensors for each time step of the prediction horizon reducing the total communication cost over the prediction horizon subject to the constraint on state estimation accuracy for each time step of the prediction horizon.

3. The receding horizon state estimator of claim 2, wherein the configuration of the external sensors for each time step includes a communication cost of each external sensor for the corresponding time step.

4. The receding horizon state estimator of claim 2, wherein the processor is configured to solve the mixed integer optimization problem using a branch and bound method.

5. The receding horizon state estimator of claim 1, wherein the processor is configured to reduce the total communication cost using a heuristic approximation of minimization of the total communication cost while satisfying the constraint on state accuracy for each time step.

6. The receding horizon state estimator of claim 5, wherein, in response to failing to satisfy the constraint of state estimation accuracy for a time step with external measurements of the entire set of corresponding external sensors, the heuristic approximation back-steps to expand the subset of external sensors determined for the previous time step.

7. The receding horizon state estimator of claim 5, wherein the heuristic approximation includes one or combination of a greedy subtraction heuristic, a greedy addition heuristic, and a random heuristic.

8. The receding horizon state estimator of claim 7, wherein the configuration of the external sensors for each time step includes utilities of the external sensors accessible for each corresponding time step, wherein a utility of an external sensor is a function of a communication cost of receiving external measurements from the external sensor and a dependence of a state estimation accuracy on the external measurements of the external sensor, and wherein the heuristic approximation determines the subset of external sensors based on their utilities.

9. The receding horizon state estimator of claim 8, wherein the function is a ratio of the dependence of the state estimation accuracy to the communication cost.

10. The receding horizon state estimator of claim 8, wherein the dependence of the state estimation accuracy on the external measurements of the external sensor is a difference between the state estimation accuracy determined with and without the external measurements of the external sensor.

11. The receding horizon state estimator of claim 8, wherein the processor uses the greedy subtraction heuristic configured to iteratively remove external sensors from the subset of external sensors in a reverse order of their utility until a prediction of the state estimation accuracy using the external measurements of the subset of external sensors satisfies the constraint on state estimation accuracy.

12. The receding horizon state estimator of claim 8, wherein the processor uses the greedy addition heuristic configured to iteratively add external sensors to the subset of external sensors in an order of their utility until a prediction of the state estimation accuracy using the external measurements of the subset of external sensors satisfies the constraint on state estimation accuracy.

13. The receding horizon state estimator of claim 1, wherein the processor is further configured to
    determine a distance between a vehicle and the nearest obstacle to a movement of the vehicle at each time step; and
    determine the constraint on state estimation accuracy for a time step as a function of the distance determined for the time step.

14. The receding horizon state estimator of claim 13, wherein the constraint on state estimation accuracy bounds an error between an actual state of the vehicle and estimated state of the vehicle.

15. The receding horizon state estimator of claim 14, wherein the error between the actual state and the estimated state is inherently unbounded, such that the constraint is determined by probabilistically defining a probability of the error being within the bounds.

16. The receding horizon state estimator of claim 15, wherein the processor transforms the probabilistic constraint to a scalar inequality, such that satisfaction of the probabilistic constraint is equivalent to checking the inequality.

17. The receding horizon state estimator of claim 1, wherein the input interface receives the constraint on state estimation accuracy for each time step of the prediction horizon from a controller controlling a movement of the vehicle, and wherein the output interface submits the state of the vehicle for the current time step to the controller.

18. The receding horizon state estimator of claim 1 arranged at the vehicle, such that the internal sensors are sensors of the vehicle and the external sensors are sensors external to the vehicle.

19. The receding horizon state estimator of claim 1 arranged at an edge computing device installed in proximity to an edge of a road the vehicle is traveling on, such that the internal sensors are sensors of the edge computing device and the external sensors are sensors of the vehicle.

20. A method for estimating a state of a vehicle based on a prediction horizon, wherein the method uses a processor operatively connected to internal sensors for providing internal measurements over internal communication channel and operatively connected to external sensors for providing external measurements over shared communication channel, wherein the processor is coupled with stored instructions implementing the method, wherein the instructions, when executed by the processor carry out steps of the method, comprising:
    accepting configuration of a set of external sensors for each time step of the prediction horizon and a constraint on state estimation accuracy for each time step of the prediction horizon;
    selecting, for each time step of the prediction horizon, a subset of a corresponding set of external sensors with external measurements sufficient to estimate the state of the vehicle that satisfies the constraint on state estimation accuracy for a corresponding time step while reducing a total communication cost of acquiring the external measurements over the prediction horizon, wherein a state estimation accuracy for a time step is a function of a previous state estimation accuracy for a previous time step;
    requesting the external measurements from the subset of external sensors determined for a current time step;
    estimating the state of the vehicle using the internal measurements of the internal sensors and the requested external measurements of the subset of external sensors determined for the current time step; and
    outputting the state of the vehicle for the current time step.

* * * * *